(12) United States Patent
Abe et al.

(10) Patent No.: US 7,360,019 B2
(45) Date of Patent: *Apr. 15, 2008

(54) DISK ARRAY DEVICE AND DATA PROCESSING METHOD THEREOF

(75) Inventors: Tetsuya Abe, Fujisawa (JP); Mitsuru Inoue, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/812,277

(22) Filed: Jun. 18, 2007

(65) Prior Publication Data

US 2007/0245080 A1    Oct. 18, 2007

Related U.S. Application Data

(63) Continuation of application No. 11/490,176, filed on Jul. 21, 2006, now Pat. No. 7,269,690, which is a continuation of application No. 10/864,644, filed on Jun. 10, 2004, now Pat. No. 7,103,717.

(30) Foreign Application Priority Data

Apr. 7, 2004    (JP)    ............................. 2004-113179

(51) Int. Cl.
*G06F 12/00* (2006.01)

(52) U.S. Cl. .................. 711/114; 711/119; 711/162

(58) Field of Classification Search ................ 711/114
See application file for complete search history.

(56) References Cited

U.S. PATENT DOCUMENTS

| | | | | |
|---|---|---|---|---|
| 5,404,487 A | * | 4/1995 | Murata et al. ............... | 711/113 |
| 5,636,359 A | | 6/1997 | Beardsley et al. ........... | 711/122 |
| 5,655,150 A | * | 8/1997 | Matsumoto et al. .......... | 710/17 |
| 5,694,570 A | | 12/1997 | Beardsley et al. .......... | 711/113 |
| 5,771,367 A | * | 6/1998 | Beardsley et al. .......... | 711/113 |
| 5,884,098 A | | 3/1999 | Mason, Jr. | |
| 6,065,085 A | | 5/2000 | Odenwald, Jr. | |
| 6,148,368 A | * | 11/2000 | DeKoning ................... | 711/113 |

(Continued)

FOREIGN PATENT DOCUMENTS

JP    11312126    11/1999

OTHER PUBLICATIONS

G. Castets, et al "IBM TotalStorage Enterprise Storage Server Model 800" Online! Oct. 2002, pp. 49-92.

*Primary Examiner*—Donald Sparks
*Assistant Examiner*—Hahem Farrokh
(74) *Attorney, Agent, or Firm*—Mattingly, Stanger, Malur & Brundidge, P.C.

(57) ABSTRACT

A data processing method for a disk array device capable of achieving a duplex system of data and improving performance of the same device while a quantity of processing for writing into a cache memory (through a switch) is reduced. In the disk array device, a host interface portion comprises a nonvolatile memory portion for saving data written from a host computer/server, and a data transfer control portion for transferring write data from the host computer/server to the nonvolatile memory portion and a global cache memory portion. If a write request is received from the host computer/server, a data transfer control portion transfers the write data from the host computer/server to the nonvolatile memory portion and to the global cache memory portion through a switch portion.

20 Claims, 16 Drawing Sheets

U.S. PATENT DOCUMENTS

| | | |
|---|---|---|
| 6,601,134 B1 | 7/2003 | Yamagami et al. |
| 6,792,507 B2 | 9/2004 | Chiou et al. |
| 7,103,717 B2 | 9/2006 | Abe et al. |
| 2002/0156983 A1 | 10/2002 | Jones et al. |
| 2003/0149839 A1 | 8/2003 | Kuwata ............... 711/113 |
| 2003/0200389 A1 | 10/2003 | Beardsley et al. |
| 2004/0139365 A1 | 7/2004 | Hosoya |
| 2005/0055522 A1 | 3/2005 | Yagi ..................... 711/163 |

* cited by examiner

FIG. 7

| START ADDRESS | REGION SIZE | ADMINI-STRATIVE MPID | ADMINI-STRATIVE PORT ID | WRITE PENDING FLAG | PROTECTION FLAG INFOR-MATION | RELATED CACHE MEMORY (OR NONVOLATILE MEMORY ADDRESS INFORMATION) |
|---|---|---|---|---|---|---|
| 0x00000 | 256 | 00 | 00 | 01 | 01 | 0x40000 |
| 0x00100 | 256 | FF | FF | 00 | 00 | 0x40100 |
| ⋮ | ⋮ | 00 | 00 | 00 | 00 | 0x00000 |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |

FIG. 16

| START ADDRESS | REGION SIZE | ADMINISTRATIVE MPID | ADMINISTRATIVE PORT ID | WRITE PENDING FLAG | PROTECTION IDENTIFIER | TIME STAMP | RELATED CACHE MEMORY (OR NONVOLATILE MEMORY ADDRESS INFORMATION) |
|---|---|---|---|---|---|---|---|
| 0x00000 | 256 | 00 | 00 | 01 | 01 | 000000 | 0x40000 |
| 0x00100 | 256 | FF | FF | 00 | 00 | 000000 | 0x40100 |
| ⋮ | ⋮ | 00 | 00 | 00 | 00 | 000000 | 0x00000 |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

DISK ARRAY DEVICE AND DATA PROCESSING METHOD THEREOF

CROSS-REFERENCE TO RELATED APPLICATION

The present application is a continuation of application Ser. No. 11/490,176, filed Jul. 21, 2006, now U.S. Pat. No. 7,269,690; which is a continuation of application Ser. No. 10/864,644, filed Jun. 10, 2004, now U.S. Pat. No. 7,103,717; which claims priority from Japanese patent application No. JP 2004-113179 filed on Apr. 7, 2004, the content of which are incorporated by reference.

BACKGROUND OF THE INVENTION

The present invention relates to a disk array device and its data processing method and more particularly to a technique that is effectively applicable for a data processing method capable of realizing a double writing system of data while a processing of writing into a cache memory (through a switch) is reduced.

As a result of consideration by the inventors of this invention, the following techniques have been considered as conventional disk array device and its data processing.

For example, as regards the data processing technique of the conventional disk array device, there is such a technique that the cache memory for storing temporarily data between an upper device and a memory unit of the disk array device is constructed into a duplex system in order to correspond to improvement of the performance of users, so that data transferred from the upper device is stored into each cache memory so as to keep data in the duplex system for storage. According to such a technique, a switch connecting method is adopted for an internal data transfer path, which connects between the interface of the upper device and the duplex system cache memory. Under this switch connecting method, a connection between the interface of the upper device and the duplex system cache memory, and a connection between the interface of a memory unit and the duplex system cache memory are respectively made one-on-one through a switch portion (see Japanese Patent Laid-open No. 11-312126).

As a result of consideration by the above-mentioned inventors, as regards the conventional disk array device and its data processing technique, the following matters have been made evident.

For example, according to the data processing technique of the conventional disk array device, since the connection between the interface of the upper device and the duplex system cache memory, and the connection between the interface of the memory unit and the duplex system cache memory are made one-on-one through the same switch portion, there is the problem that double writing of the same data consumes double power as compared to the case where a switch region is single-written.

That is, when storing data transferred from the upper device into the duplex system cache memory, the switch portion needs a region for storing data sent from the upper device, into one of the cache memories from the interface of the upper device through the switch portion, and another region for storing the same data into the other cache memory through the same switch. Consequently, the region for the switch portion needs to be in double amount when the same data is executed in a double writing system as compared to the case where the same data is executed in a single writing system. For the reason, it is desirable to equalize the band region of the switch portion to the single writing system along with a concept of the double writing system.

SUMMARY OF THE INVENTION

Accordingly, an object of the present invention is to provide a disk array device and its data processing technique capable of improving the performance of the device by forming data into a duplex system while the processing for writing into the cache memory (through a switch) is reduced.

The above and other objects and novel features of the present invention will become apparent from the description of this specification and the accompanying drawings.

Outlines of representative ones of inventions disclosed in the present application will be briefly described as follows.

The present invention is applied to a disk array device comprising: a plurality of memory devices for storing data; a memory device control portion for controlling write or read of data to/from the plurality of memory devices; a channel control portion for receiving a write or read request from an upper device disposed outside a disk array device; a cache memory for storing temporarily data transmitted between the upper device and the plurality of memory devices; and a connecting portion connected to the channel control portion, the memory device control portion, and the cache memory, and also the present invention is applied to a data processing method thereof and has the following features.

That is, in the present invention, the channel control portion comprises: a nonvolatile memory for saving write data from the upper device; and a data transfer control portion for transferring the write data from the upper device, to the nonvolatile memory and the cache memory, and the channel control portion transfers the write data from the upper device, to the nonvolatile memory and to the cache memory through the connecting portion, by the data transfer control portion and then writes the write data therein when the write request from the upper device is received. Further, the memory device control portion transfers the data written in the cache memory, from the cache memory to the memory device and then writes the transferred data therein, and the channel control portion releases a region of the data written in the nonvolatile memory after the data in the cache memory is written into the memory device.

Also, in the present invention, the channel control portion reads out the data written in the nonvolatile memory and writes the read data into the cache memory at the time of recovery after failure occurs in the cache memory, and the memory device control portion reads out the data written in the cache memory and transfers the read data to the memory device and writes the transferred data therein. Further, the channel control portion releases a region of the data written in the nonvolatile memory after data in the cache memory is written into the memory device.

Additionally, in the present invention, the channel control portion reads out the data written in the nonvolatile memory and transfers the read data to the memory device and writes the transferred data therein at the time of recovery after failure occurs in the cache memory. Further, the channel control portion releases a region of the data written in the nonvolatile memory after data in the nonvolatile memory is written into the memory device.

Also, in the present invention, the memory device control portion comprises: a nonvolatile memory for storing data written in the cache memory; and a data transfer control portion for transferring the data written in the cache memory to the nonvolatile memory and the memory device, and the memory device control portion transfers, by the data transfer control portion, the data written into the cache memory to the nonvolatile memory and the memory device and then writes the transferred data therein when a destage request is received. Further, the memory device control reads out the data written in the nonvolatile memory and transfers the read data to the memory device and writes the transferred data therein when the data written in the cache memory is not transferred to the memory device. Sill further, the memory device control portion releases a region of the data written in the nonvolatile memory after data in the nonvolatile memory is written into the memory device.

Also, in the present invention, the number of said channel control portion is two or more to receive a write or read request through a plurality of paths between the upper device and the channel control portion; each of first and second channel control portions comprises a nonvolatile memory for saving write data from the upper device through each path, and a data transfer control portion for transferring the write data from the upper device to the nonvolatile memory and the cache memory; and when a second write data is inputted after a first write data, the first channel control portion confirms that the first write data is transferred from the cache memory to the memory device and written, and thereafter saves the first write data within the nonvolatile memory, and the second channel control portion confirms that the second write data is transferred from the cache memory to the memory device and written, and thereafter saves the second write data in the nonvolatile memory. More specifically, if respective portions of the first write data and the second write data are the same, the portion of the first write data is saved and the portion of the second write data is eliminated. Additionally, if the first write data and the second write data are the same, the first and second write data are saved.

Effects obtained from representative ones of inventions disclosed in the present application will be briefly described as follows.

According to the present invention, the duplex system of data can be realized while reducing the processing of write to the cache memory through a switch thereby improving the performance of the device. Consequently, data reliability can be maintained while corresponding to increases in processing speed of the device and enlargement in the size of the device.

BRIEF DESCRIPTION OF THE DRAWINGS

FIG. 7 is a diagram showing a control table for communication between the disk interface portion and host interface portion in the disk array device according to the embodiment of the present invention.

FIG. 16 is a diagram showing a control table including time control information in the case of securing multiplex backups in the plurality of nonvolatile memory portions in the disk array device according to an embodiment of the present invention.

DESCRIPTION OF THE PREFERRED EMBODIMENTS

Hereinafter, an embodiment of the present invention will be detailed based on the drawings. Note that members having the same function are denoted by the same reference symbol in principle throughout all the drawings for explaining the embodiment and the repetitive description thereof will be omitted.

<Conceptual Configuration of Disk Array Device>

Figure 1:
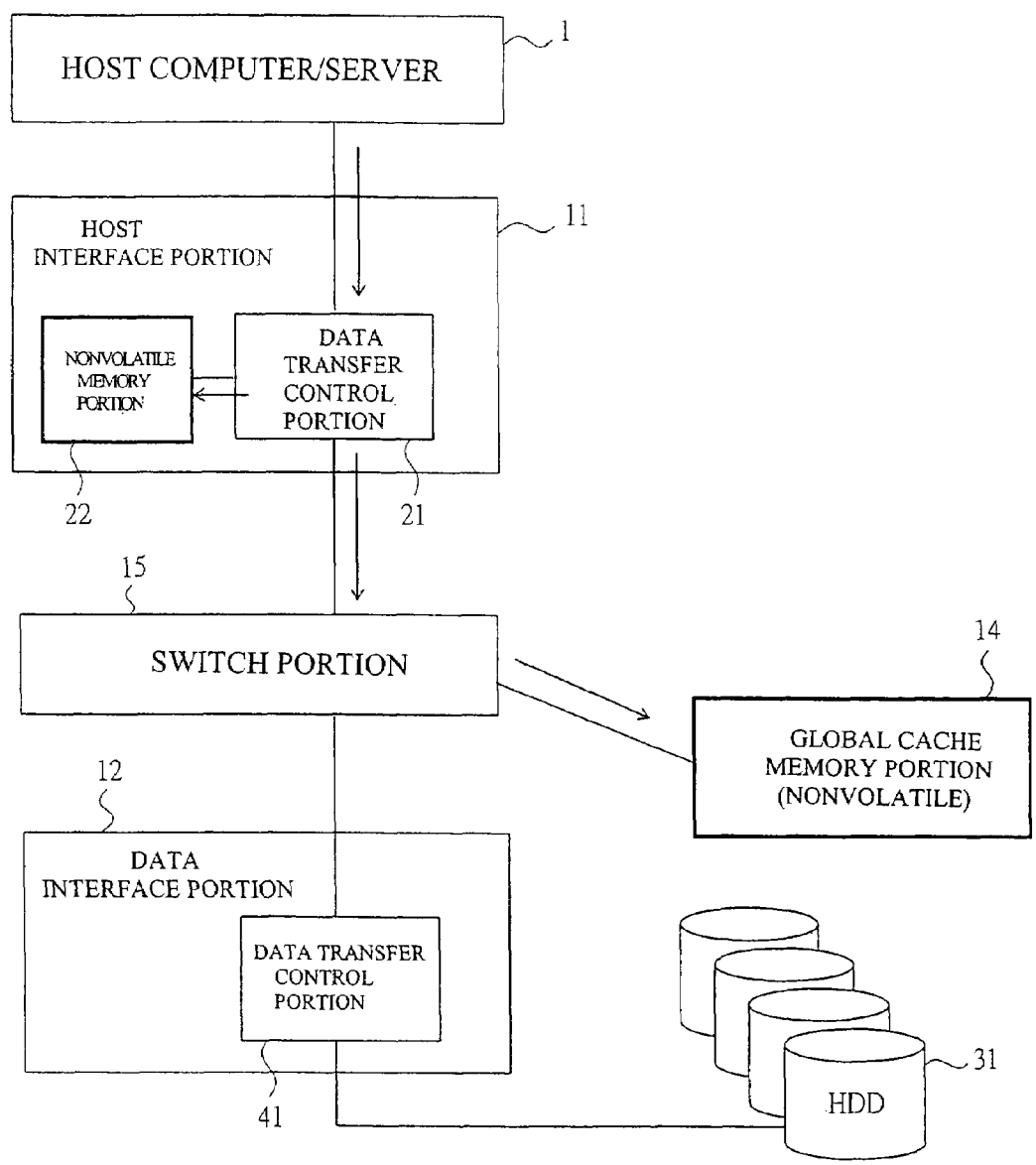
FIG. 1 is a diagram showing a conceptual structure of the disk array device according to an embodiment of the present invention.

An example of the conceptual configuration of the disk array device according to an embodiment of the present invention will be described with reference to FIG. 1. FIG. 1 is a diagram showing the conceptual configuration of the disk array device.

The disk array device of this embodiment comprises: a host interface portion (channel control portion) 11, which is connected to a host computer/server (upper device) 1 located outside the disk array device, includes a hard disk drive (HDD: memory unit) of a magnetic disk unit 2 for storing data, and receives a write request or a read request from the host computer/server 1; a disk interface portion (memory device control portion) 12 for controlling the writing or reading of data to the HDD 31; a global cache memory portion (cache memory) 14 which temporarily stores data exchanged between the host computer/server 1 and the HDD 31 by communication; and a switch portion (connecting portion) 15 which is connected to the host interface portion 11, the disk interface portion 12, and the global cache memory portion 14.

Under such a structure, particularly, the host interface portion 11 includes: a nonvolatile memory portion 22 for storing write data from the host computer/server 1; and a data transfer control portion 21 for transferring the write data from the host computer/server 1 to the nonvolatile memory portion 22 and the global cache memory portion 14. If a write request is received from the host computer/server 1, the data transmission control portion 21 transfers the write data from the host computer/server 1 to the nonvolatile memory portion 22 and the global cache memory portion 14 through the switch portion 15. The double writing of this write data may be executed at the same time or with a difference in time enabling the double writing to be achieved eventually. At this time, the switch portion 15 is connected to the global cache memory portion 14 through a single path. Then, the disk interface portion 12 transfers the data written into the global cache memory portion 14 from the global cache memory portion 14 to the HDD 31 and, after the data in the global cache memory portion 14 is written into the HDD 31, the host interface portion 11 releases a region for the data written in the nonvolatile memory portion 22.

<Entire Structure of Disk Array Device>

Figure 2:
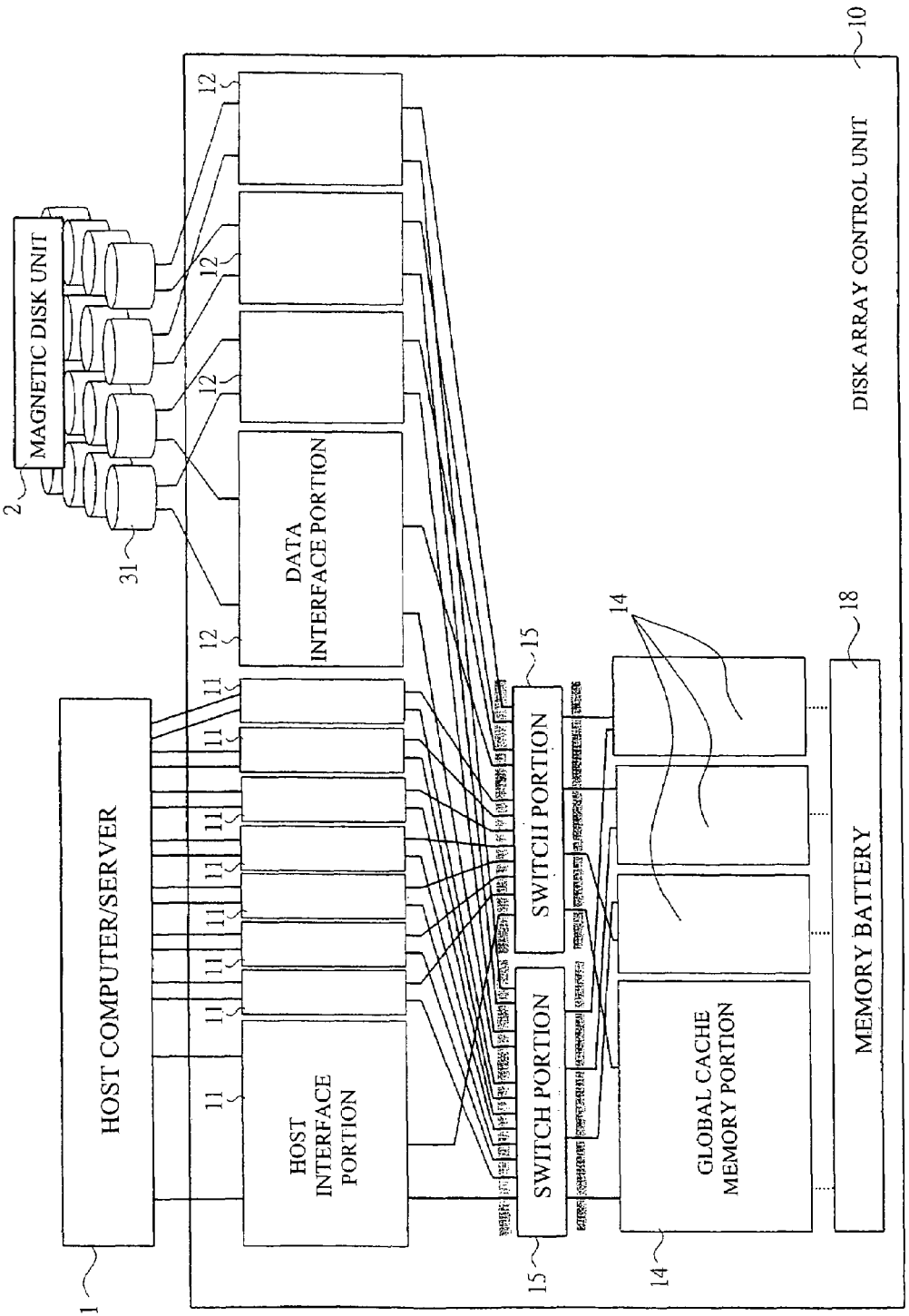
FIG. 2 is a diagram showing the entire structure of the disk array device according to an embodiment of the present invention.

An example of the disk array device according to this embodiment will be described with reference to FIG. 2. FIG. 2 is a diagram showing the entire structure of the disk array device.

The disk array device of this embodiment can be constructed of minimum components as shown in FIG. 1 in some cases. However, with increase in disk capacity or cache memory capacity, enlargement of the device for extension etc. of switches, and increase in processing speed etc., there is mainly constructed with a structure capable of corresponding to such high speed and large scale as shown in FIG. 2 in order to satisfy those demands. The disk array device as shown in FIG. 2 is connected to the host computer/server 1 through a plurality of device groups and a plurality of paths and, also in the disk array device, the disk array control unit is connected to the plurality of HDDs in the magnetic disk unit 2 through the plurality paths.

In the disk array device, its disk array control unit 10 comprises a plurality of host interface portions 11, disk interface portions 12, global cache memory portions 14, and switch portions 15. In this example, eight host interface portions 11, four disk interface portions 12, four global cache memory portions 14, and further two switch portions 15 are provided, and a memory battery 18 for supplying power to the global cache memory portion 14 at an interruption of power supply is provided. Note that the disk array control unit 10 includes a shared memory portion for storing control information, a service processor for controlling the same device and the like although not shown.

In a structure in which the eight host interface portions 11 and the four disk interface portions 12 are connected to the two switch portions 15 fewer in number than them, paths for the global cache memory portion 14 and the switch portion 15 compete with each other because the respective interface portions 11 and 12 request the switch portions 15 to transfer the data to the global cache memory portion 14. Particularly, if the double writing occurs, the degree of competitiveness increases because the two paths are occupied. According to this embodiment, by providing with the nonvolatile memory portion 22 inside the host interface portion 11 and writing the data from the host computer/server 1 into the internal nonvolatile memory portion 22 and the global cache memory portion 14 through the switch portion 15 by the data transmission control portion 21, a ratio of the paths occupied in the switch portion 15 can be reduced even in the case of the double writing.

The disk array device of this embodiment controls the magnetic disk unit 2 according to a command received from the host computer/server 1, for example. For example, a data input/output request is received from the host computer/server 1 so as to read or write data to be memorized in the HDD 31 in the magnetic disk unit 2.

The host computer/server 1 is an information processing unit such as a computer or server including CPU and memory. By executing various kinds of programs with the CPU possessed by the host computer/server 1, various kinds of functions are achieved. The host computer can be, for example, a personal computer or a work station or a main frame computer.

This host computer/server 1 can be an information processing unit for different users. Note that the user mentioned here refers to corporations, or divisions and sections in a corporation, or individuals.

The host computer/server 1 is communicably connected to a disk array control unit 10 through, for example, storage area network (SAN). The SAN is a network which exchanges the data between a block which is a unit of data control for storage resources provided by the magnetic disk unit 2 and the host computer/server 1. Communication between the host computer/server 1 and the disk array control unit 10 through the SAN is executed according to, for example, fiber channel protocol. The host computer/server 1 transmits a data access request of each block to the disk array control unit 10 according to the fiber channel protocol.

The host computer/server 1 is communicably connected directly to the disk array control unit 10 without interposing a network such as the SAN. The direct communication between the host computer/server 1 and the disk array control unit 10 without interposing the network is executed according to a communication protocol such as FICON (fiber connection)™, ESCON (enterprise system connection)™, ACONARC (advanced connection architecture)™ and FIBARC (fiber connection architecture)™. The host computer/server 1 transmits a data access request of each block to the disk array control unit 10 according to this communication protocol.

Of course, the host computer/server 1 and the disk array control unit 10 may be connected to each other not only through the SAN or directly without interposing the SAN, but also through a local area network (LAN), for example. In the case of the connection through the LAN, communication can be carried out according to a transmission control protocol/Internet protocol (TCP/IP).

The magnetic disk unit 2 has a number of memory devices. Consequently, a large capacitive memory region can be provided to the host computer/server 1. The memory device can be formed of a data memory medium such as the HDD 31 or a plurality of HDDs 31 composed of a redundant array of inexpensive disks (RAID). A logical volume which is a logical recording region can be set in a physical volume which is a physical memory region provided by the HDD 31.

The disk array control unit 10 and the magnetic disk unit 2 can be connected to each other directly or through a network. Further, the magnetic disk unit 2 can be formed integrally with the disk array control unit 10.

Figure 3:
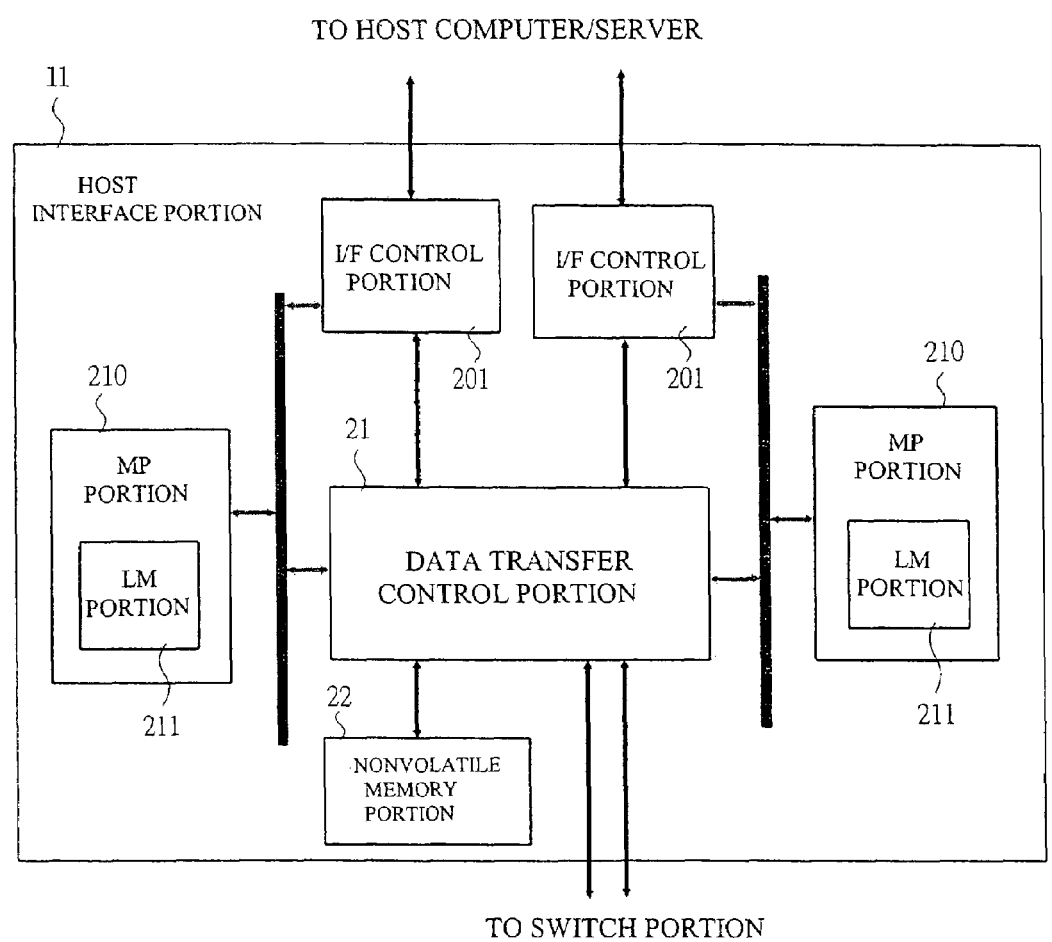
FIG. 3 is a diagram showing the structure of a host interface portion in the disk array device according to an embodiment of the present invention.
Figure 4:
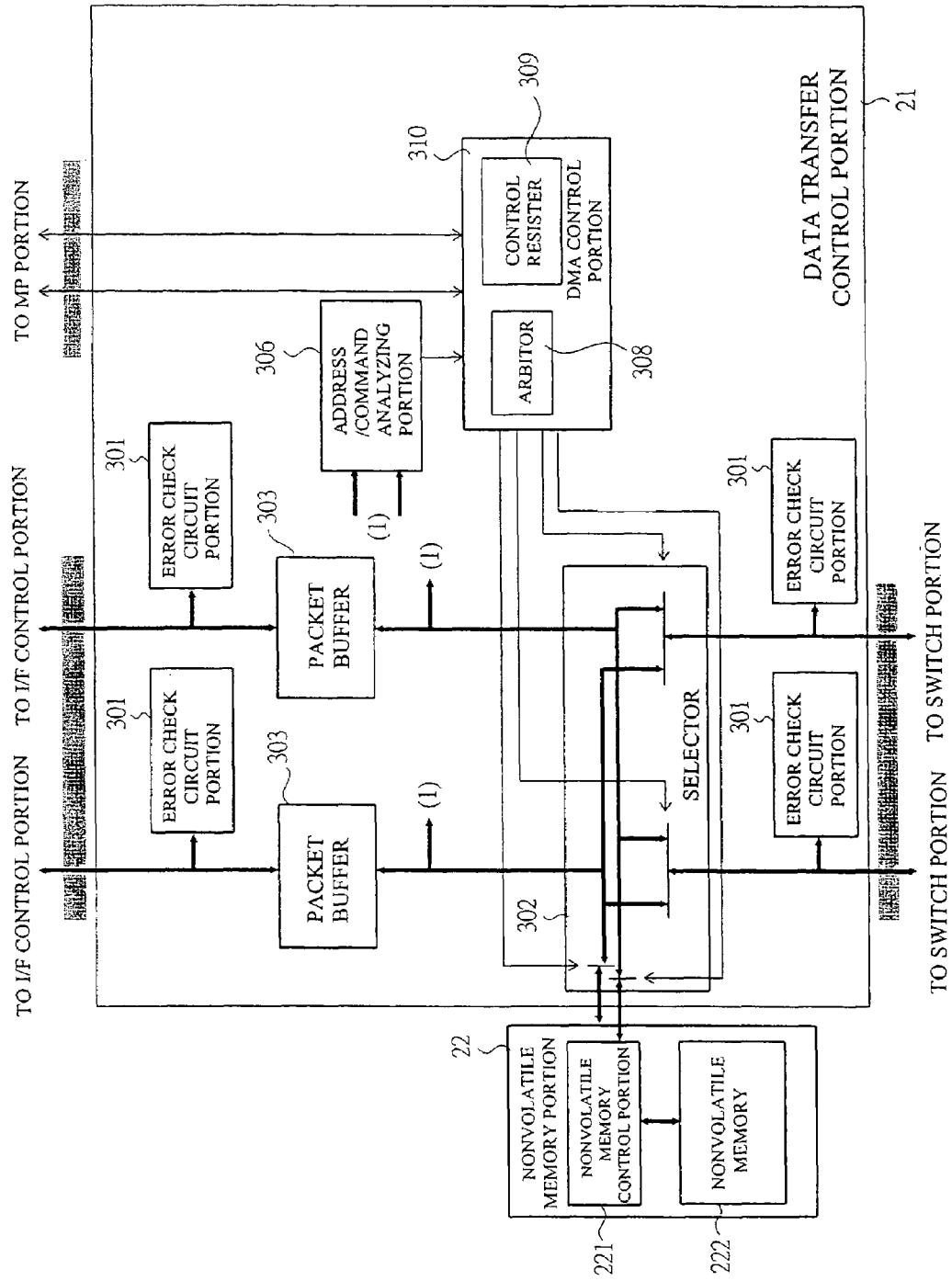
FIG. 4 is a diagram showing the structure of a data transmission control portion and a nonvolatile memory portion in the disk array device according to an embodiment of the present invention.

The host interface portion 11 in the disk array control unit 10 is provided with a communication interface for communicating with the host computer/server 1 and has a function of exchanging data input/output command with the host computer/server 1. The detailed structure is shown in FIGS. 3 and 4. Note that the host interface portions 11 are connected along with a service processor through an internal LAN, so that a micro program etc. to be executed in the host interface portion 11 can be received from the service processor and installed.

The switch portion 15 connects the host interface portion 11, the disk interface portion 12, the global cache memory portion 14, the shared memory portion, and the service processor to each other. Exchange of data and commands among the host interface portion 11, the disk interface portion 12, the global cache memory portion 14, the shared memory portion, and the service processor is executed through the switch portion 15. The switch portion 15 is constituted by, for example, a crossbar switch.

The global cache memory portion 14 and the shared memory portion are storage memories shared by the host interface portion 11 and the disk interface portion 12. The global cache memory portion 14 is utilized for storing mainly data while the shared memory portion is used for mainly storing control information and commands, etc.

For example, if the data input/output request which some host interface portion 11 receives from the host computer/server 11 is the write command, the host interface portion 11 writes a write command into the shared memory portion and writes the write data received from the host computer/server 1, into the global cache memory portion 14. On the other hand, the disk interface portion 12 monitors the shared memory portion. If the disk interface portion detects that the write command is written into the shared memory, it reads out the write data from the global cache memory according to the above command and it writes into the HDD 31 in the magnetic disk unit 2.

If the data input/output request received by some host interface portion 11 from the host computer/server 1 is a read command, the host interface portion 11 investigates whether or not data to be a read-out target exists in the global cache memory 14. If such data exists in the global cache memory 14, the host interface portion 11 sends the data to the host computer/server 1. On the other hand, unless data to be a read-out target exists in the global cache memory portion 14, the host interface portion 11 writes a read command into the shared memory portion and monitors the shared memory portion. After detecting that the read command is written into the shared memory, the disk interface portion 12 reads out the data to be a read-out target from the HDD 31 in the magnetic disk unit 2 and writes it into the global cache memory portion 14 and, at the same time, writes that effect into the shared memory portion. If the host interface portion 11 detects that the data to be a read-out target is written into the global cache memory portion 14, it sends the data to the host computer/server 1.

Thus, the data is exchanged between the host interface portion 11 and the disk interface portion 12 through the global cache memory portion 14. Of data to be stored in the HDD 31, the data that is read or written by the host interface portion 11 or the disk interface portion 12 is stored in the global cache memory portion 14. Further, as described later, at the time of a double writing operation, the data is written into the nonvolatile memory portion 22 inside the host interface portion 11 as well as the global cache memory portion 14.

Note that, in addition to a structure for dispatching indirectly a data write/read instruction from the host interface portion 11 into the disk interface portion 12 through the shared memory portion, for example, it is permissible to dispatch directly the data write/read instruction to the disk interface portion 12 from the host interface portion 11 without interposing the shared memory portion. Further, the host interface portion 11 may be provided with the function of the disk interface portion 12, thereby serving as a data I/O control portion.

Figure 10:
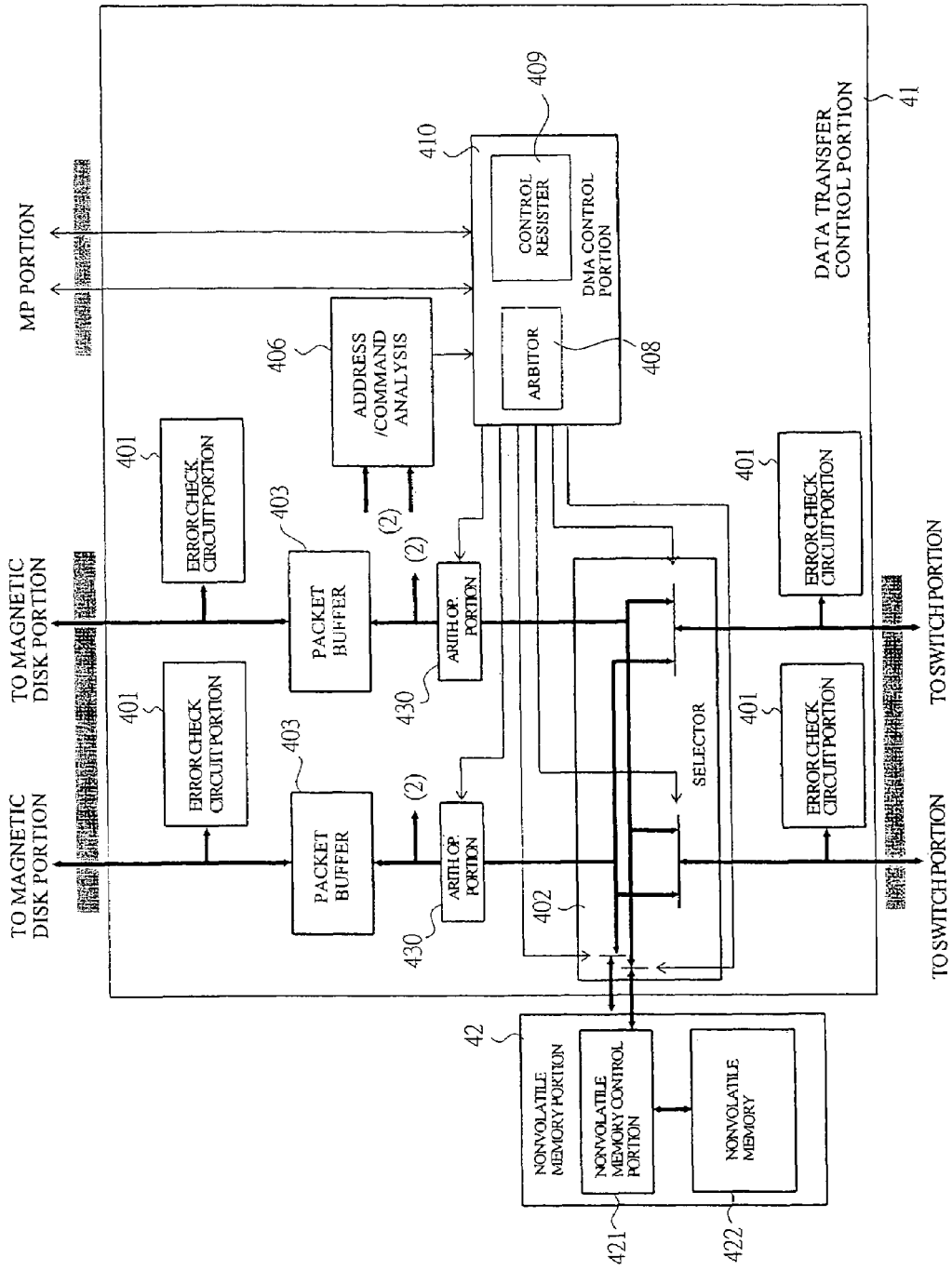
FIG. 10 is a diagram showing the structure of a disk interface portion having a nonvolatile memory portion in the disk array device according to an embodiment of the present invention.

The disk interface portion 12 is communicably connected to the plurality of HDDs 31 storing data, thereby controlling the magnetic disk unit 2. For example, as described above, the host interface portion 11 reads/writes data to the HDD 31 in response to a data I/O request received from the host computer/server 1. The detailed structure thereof is shown in FIG. 10. Note that the respective disk interface portions 12 are connected along with the service processor through the internal LAN, thereby being capable of communicating with each other. Consequently, a micro program etc. to be executed in the disk interface portion 12 is received from the service processor, whereby it can be installed therein.

According to this embodiment, that the global cache memory portion 14 and the shared memory portion are provided independently of the host interface portion 11 and the disk interface portion 12 has been described. However, the present invention is not limited to this example, and it is also preferable that the global cache memory portion 14 and the shared memory portion are provided dispersedly to the host interface portion 11 and the disk interface portion 12. In this case, the switch portions 15 connect the host interface portions 11 having the dispersed global cache memory portions 14 or the shared memory portion, and the disk interface portions 12, to one another.

Further, at least any one of the host interface portions 11, the disk interface portions 12, the global cache memory portions 14, the switch portions 15, and the shared memory portion may be integrated with the other one.

The service processor is a computer for maintenance and control of the disk array control unit 10. By operating the service processor, an operator can set up: a configuration of the HDD 31 in the magnetic disk unit 2; a path which is a communication route between the host computer/server 1 and the host interface portion 11; and a logical volume, and can further install a micro program to be executed in the host interface portion 11 or the disk interface portion 12. Here, the setting of the configuration of the HDD 31 in the magnetic disk unit 2 includes increasing or decreasing the quantity of the HDDs 31, changing of the RAID configuration (changing from RAID 1 to RAID 5), and the like.

Further, the service processor carries out confirmation of the operating condition of the disk array control unit 10, identification of a fault location section, and installation of an operating system to be executed in the host interface portion 11, and the like. These setting and control can be carried out by the operator etc. through a user interface possessed by the service processor or a user interface in an information processing unit of an administrative client which displays a Web page provided by a Web server operating in the service processor. The operator etc. can set up a target of content to be a monitored as failure and a destination of failure notification, by operating the service processor.

The service processor may be configured so as to be incorporated within the disk array control unit 10 or attached externally. The service processor may be formed as a computer which carries out only maintenance and control of the disk array control unit 10 and the magnetic disk unit 2 or formed by providing a general purpose computer with a maintenance/control function.

<Structure of Host Interface Portion>

An example of the structure of the host interface portion in the disk array device of this embodiment will be described with reference to FIG. 3. FIG. 3 is a diagram showing the structure of the host interface portion.

The host interface portion 11 is one example which is connected to the host computer/server 1 and the switch portion 15 through, for example, two paths. The host interface portion 11 comprises: two I/F control portions 201 each having an interface (I/F) for the host computer/server 1; two micro processors (MP) 210 for controlling input/output to the host computer/server 1; a data transfer control portion 21 for transferring and controlling the transfer of data from the host computer/server 1; and a nonvolatile memory portion 22 for storing the data from the host computer/server 1. Each MP portion 210 is provided with a local memory (LM) portion 211 for storing a control program, whereby the I/F control portion 201, the data transfer control portion 21 and the MP portion 210 are controlled based on this control program.

In this host interface portion 11, the I/F control portion 201 receives data from the host computer/server 1 and sends it to the data transfer control portion 21 by controlling the protocol. This protocol differs depending on the fiber I/F, main frame I/F or the like. Then, the data transfer control portion 21 can write the data from the host computer/server 1 into the nonvolatile memory portion 22 or read the data from the global cache memory portion 14, in response to an instruction from the MP portion 210.

<Structures of Data Transfer Control Portion and Nonvolatile Memory Portion>

An example of the structures of the data transfer control portion and the nonvolatile memory portion in the host interface portion in the disk array device according to this embodiment will be described with reference to FIG. 4. FIG. 4 is a diagram showing the structures of the data transfer control portion and the nonvolatile memory portion.

The data transfer control portion 21 comprises: four error check circuit portions 301 for checking errors of the data inputted through each of the I/F control portion 201 and the switch portions 15; a selector 302 for connecting the I/F control portion 201 and the switch portion 15; two packet buffers 303 for temporarily storing addresses, commands and data inputted through the I/F control portion 201; an address/command analyzing portion 306 for analyzing the inputted addresses and commands; a DMA control portion 310 for controlling a changeover of the selector 302; and the like. The DMA control portion 310 includes an arbitor 308 for arbitrating an access request, and a control register 309 which stores hardware information, whereby the control register 309 can be set up by the MP portion 210.

In this data transfer control portion 21, a changeover of the selector 302, in order to be connected to the plurality of I/F control portions 201 and the plurality of switch portions 15, is controlled by the DMA control portion 310. This DMA control portion 310 is controlled according to information in the address/command analyzing portion 306 which analyzes the address/command of the data from the host computer/server 1, so that the data transfer can be controlled.

The nonvolatile memory portion 22, which is connected to the selector 302 in the data transfer control portion 21, is provided outside the data transfer control portion 21. This nonvolatile memory portion 22 comprises: a nonvolatile memory control portion 221 for controlling the input/output of the data transfer control portion 21; and a nonvolatile memory 222 for storing the data transferred through the data transfer control portion 21. In this nonvolatile memory portion 22, the data transferred through the selector 302 of the data transfer control portion 21 is stored in the nonvolatile memory 222 under a control of the nonvolatile memory control portion 221.

<Data Flow of Double Writing Operation>

Figure 5:
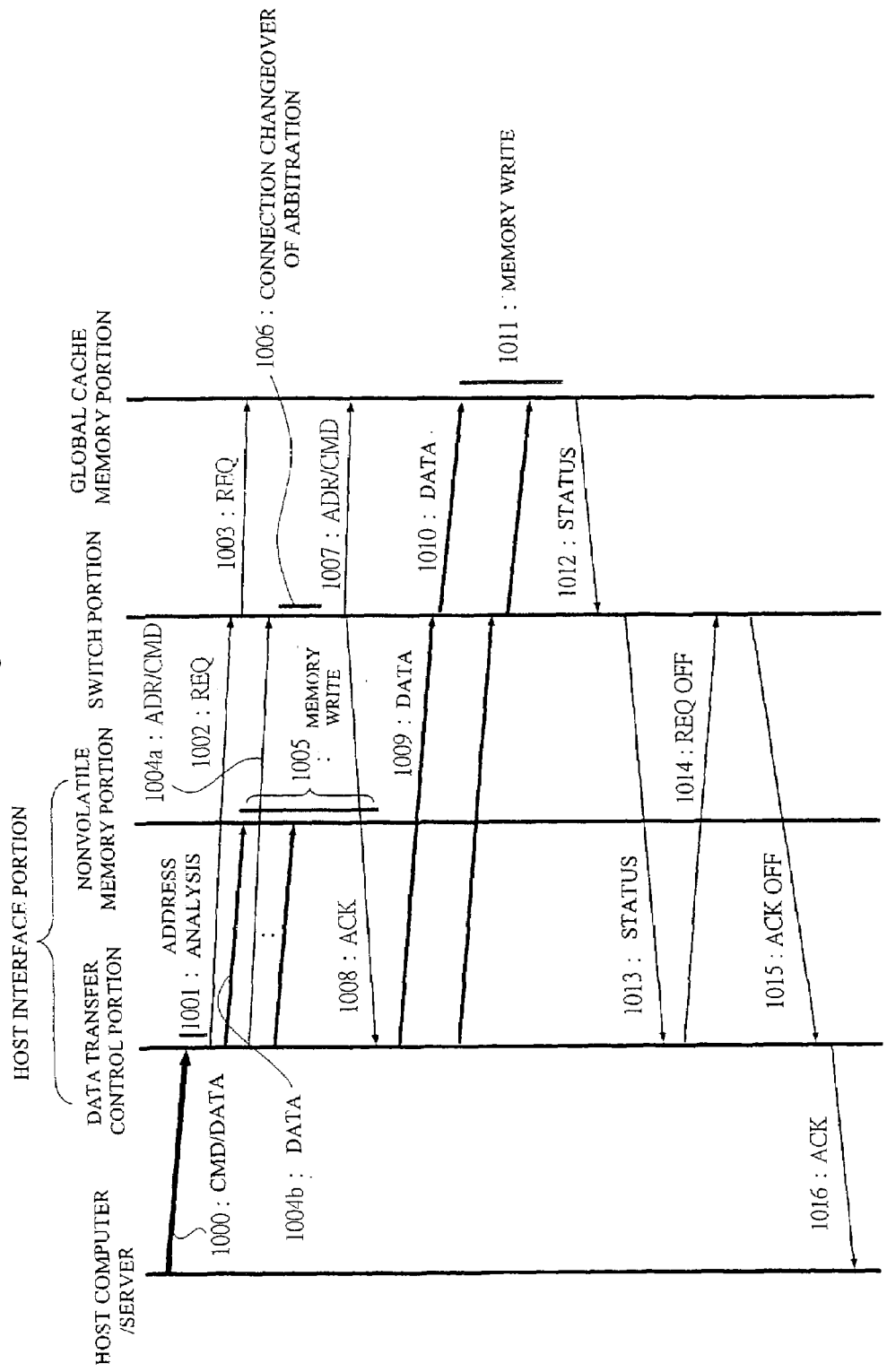
FIG. 5 is a diagram showing data flow of the double writing operation in the disk array device according to an embodiment of the present invention.

An example of a data flow of a double writing operation in the disk array device of this embodiment will be described with reference to FIG. 5. FIG. 5 is a diagram showing the data flow of the double writing operation. In FIG. 5 and Figure shown later, a request signal, an acknowledge signal, a command and an address are respectively abbreviated as "REQ", "ACK", "CMD" and "ADR".

First, if command/data is sent from the host computer/server 1, this transferred command/data is received by the host interface portion 11 and stored in a packet buffer 303 in the data transfer control portion 21 (step 1000) and subjected to address analysis in the address/command analyzing portion 306 (step 1001). Then, the data transfer control portion 21 sends a request signal indicating an access startup to the switch portion 15 through the selector 302 (step 1002). Further, the switch portion 15 sends the request signal to the global cache memory portion 14 (step 1003).

Subsequently, the data transfer control portion 21 sends the address and command stored in the packet buffer 303 continuously to the switch portion 15 (step 1004a). In parallel (step 1004b), the data transfer control portion 21 transfers the data stored in the packet buffer 303 to the nonvolatile memory portion 22. Then, in the nonvolatile memory portion 22, the data from the host computer/server 1 is written into the nonvolatile memory 222 under control of the nonvolatile memory control portion 221.

On the other hand, if the switch portion 15 receives the request signal from the data transfer control portion 21, it receives the address and command subsequently transmitted and is arbitrated based on the access request. Based on this result, the switch portion 15 switches its connection to the global cache memory portion 14 (step 1006). Further, the switch portion 15 continuously sends addresses and commands to the global cache memory portion 14.

The switch portion 15 sends back an acknowledge signal, which indicates that an access right to the global cache memory portion 14 is obtained, to the data transfer control portion 21 (step 1008). The data transfer control portion 21 receives this acknowledge signal and transfers the data stored in the packet buffer 303 to the switch portion 15 (step 1009). Further, the switch portion 15 transfers the transferred data, to the global cache memory portion 14 (step 1010). Then, the data from the host computer/server 1 is written into the global cache memory portion 14 (internal cache memory) (step 1011).

After memory write ends, the global cache memory portion 14 sends a status to the switch portion 15 (step 1012). Further, the switch portion 15 sends the sent status, to the data transfer control portion 21 (step 1013). Then, the data transfer control portion 21 receives this status and turns off the request signal to the switch portion 15 (step 1014).

If the switch portion 15 recognizes that the request signal from the data transfer control portion 21 is turned off, it turns off the acknowledge signal to the data transfer control portion 21 (step 1015). Then, if the data transfer control portion 21 recognizes that the acknowledge signal from the switch portion 15 is turned off, it sends the acknowledge signal to the host computer/server 1 (step 1016).

Thus, the writing of the data from the host computer/server 1 into the nonvolatile memory portion 22 and the global cache memory portion 14 allows double writing of data. At this time, different from the conventional double writing of data, the switch portion 15 only sends the write data to the global cache memory portion 14, so that the path of the global cache memory portion 14 does not have to wait for a busy state. That is, in the conventional double writing of data, data is written into two global cache memory portions. Therefore, when the writing is being carried out to a first cache memory portion, the path of a second cache memory portion becomes in a busy state, so that it needs to wait for the busy state. Thus, this embodiment can cope with the data with high speed because other processing can be executed in parallel through an empty path.

<Double Writing Operation>

Figure 6:
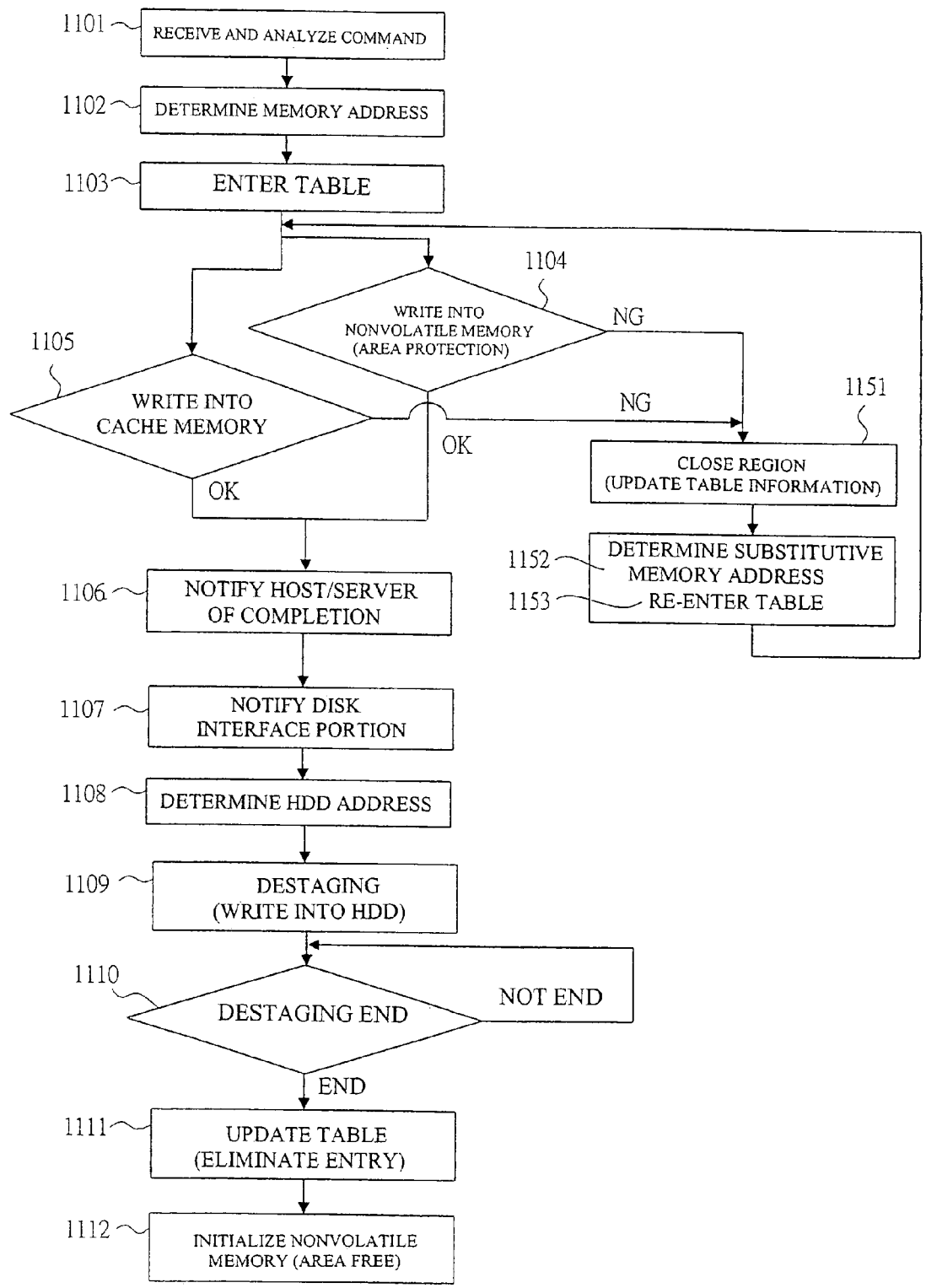
FIG. 6 is a diagram showing a processing flow of the double writing operation in the disk array device according to an embodiment of the present invention.

An example of the processing flow of the double writing operation in the disk array device of this embodiment will be described with reference to FIGS. 6 and 7. FIG. 6 is a diagram showing the processing flow of the double writing operation, and FIG. 7 is a diagram showing a control table of communication between the disk interface portion and the host interface portion.

In the double writing operation, the writing of data into the nonvolatile memory 222 in the nonvolatile memory portion 22 and the cache memory in the global cache memory portion 14, and the release of the area after this data is destaged to the HDD 31 of the magnetic disk unit 2 are executed. In this double writing operation, the control table shown in FIG. 7 is employed for the communication between the disk interface portion 12 and the host interface portion 11.

Such parameters as a start address, a region size, an administrative MPID and port ID, a write pending flag, a protection flag, a related cache memory (or nonvolatile memory), and address information are stored. This control table is provided for the global cache memory portion 41 and nonvolatile memory portion 22, for example, the LM portion 211 within the MP portion 210 of the host interface portion 11, the LM portion within the MP portion of the disk interface portion 12, and the shared memory portion.

The administrative MPID and port ID are number information and port number information of a written microprocessor, and the reference symbol "FF" means a free area. As for the write pending flag, "01" means that write pending data is left and "00" means that a write processing of all the data has ended. In the protection flag, "01" means that the write processing is protected so that only read processing is executable, and "00" means that the write processing is executable. The related cache memory (or nonvolatile memory) address information is information which indicates an address of a double writing place to the global cache memory portion 14 or the nonvolatile memory portion 22.

This control table is searched, and the administrative MPID and port ID use "FF" microprocessors. Thereby, if the write pending flag is "00" and the protection flag is "00", the write data can be written double in the global cache memory portion 14 and the nonvolatile memory portion 22.

In this double writing operation, as shown in FIG. 6, first, the host interface portion 11 of the disk array device receives a command from the host computer/server 1 and analyzes the content of this command (step 1101). Then, an empty region in the address of the nonvolatile memory portion 22 is identified, and only a determined unit or a necessary region in the empty region is secured in order to determine a memory address (step 1102). At this time, also in the global cache memory portion 14, an empty region is secured in the same way. Further, information of the respective regions secured in the nonvolatile memory portion 22 and the global cache memory portion 14 is registered in the control table (step 1103).

Subsequently, the host interface portion 11 determines whether or not the data received from the host computer/server 1 can be written into the nonvolatile memory portion 22 (step 1104), and if writable (OK), the data is written to the address determined in step 1102 of the internal nonvolatile memory portion 22 by the data transfer control portion 21, and further write-protected from being deleted. In parallel, whether or not the data from the host computer/server 1 can be written into the global cache memory portion 14 is determined (step 1105), and if writable (OK), the data is written into the address determined in step 1102 of the global cache memory portion 14 by the data transfer control portion 21. Then, after it is confirmed that the double writing processing of data to the nonvolatile memory portion 22 and the global cache memory portion 14 ends, the host computer/server 1 is notified that the double writing processing is completed (step 1106).

At this time, the data from the host computer/server 1 is secured as write pending data in the global cache memory portion 14, and its backup data is similarly stored as the write pending data in the nonvolatile memory portion 22. After the write processing by the double writing operation ends, the pending is notified to the disk interface portion 12 (step 1107). This notification may be executed through a hot line or by a method of polling the disk interface portion 12 with control information being stored in the global cache memory portion 14.

Further, the disk interface portion 12 recognized in step 1107 determines a storage destination address in order to store the data from the global cache memory portion 14 into the HDD 31 of the magnetic disk unit 2 (step 1108). This determination method is decided depending on restriction of the system with reference to the control information. Then, the disk interface portion 12 transfers the data from the global cache memory portion 14 to the HDD 31, and writes the data into the HDD 31 (step 1109). A data writing processing from the global cache memory portion 14 into the HDD 31 is called "destaging".

Subsequently, the disk interface portion 12 determines whether or not the destaging ends (step 1110), and if the destaging ends, the host interface portion 11 is informed that the destaging ends. Further, the disk interface portion 11 clears write pending information of the global cache memory portion 14, and correspondingly, the table information of the control table is updated (step 1111). Then, also in the control table of the nonvolatile memory portion 22, the pending information is cleared like step 1111, so that the write protect is also cleared and the region is restored (step 1112).

On the other hand, if the memory access is "NG" at the write to the nonvolatile memory portion 22 in step 1104 and the write to the global cache memory portion 14 in step 1105, the above-mentioned region is regarded as "NG" and the table information is updated and the region is closed so that other data is not entered by mistake (step 1151). Again, substitutive memory regions for the nonvolatile memory portion 22 and the global cache memory portion 14 are searched, and a memory address is determined similarly to step 1102 (step 1152). Then, area information secured in the nonvolatile memory portion 22 and the global cache memory portion 14 is again registered in the control table (step 1153).

According to this double writing operation, the necessity of securing an infinite amount of the memory region is eliminated by releasing the area at the same time when the destaging occurs. Because the object of this case is to secure the write pending data, the destaging of the read data does not need to store the read data in the global cache memory portion 14.

<Recovery Method when Trouble Occurs in Global Cache Memory Portion>

Figure 8:
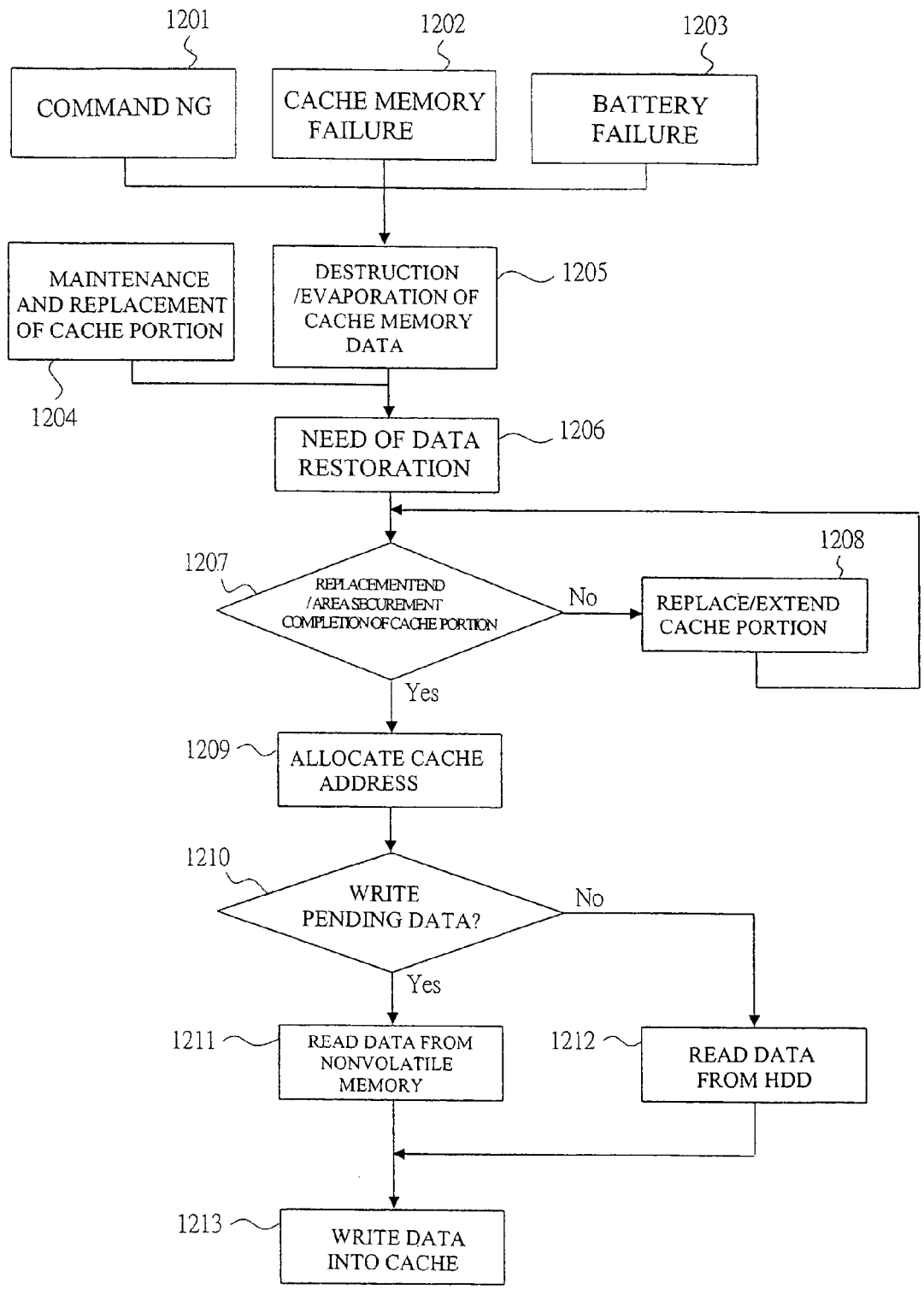
FIG. 8 is a diagram showing a recovery processing flow when data in the nonvolatile memory portion is transferred to the magnetic disk unit through the global cache memory portion in the disk array device according to an embodiment of the present invention.
Figure 9:
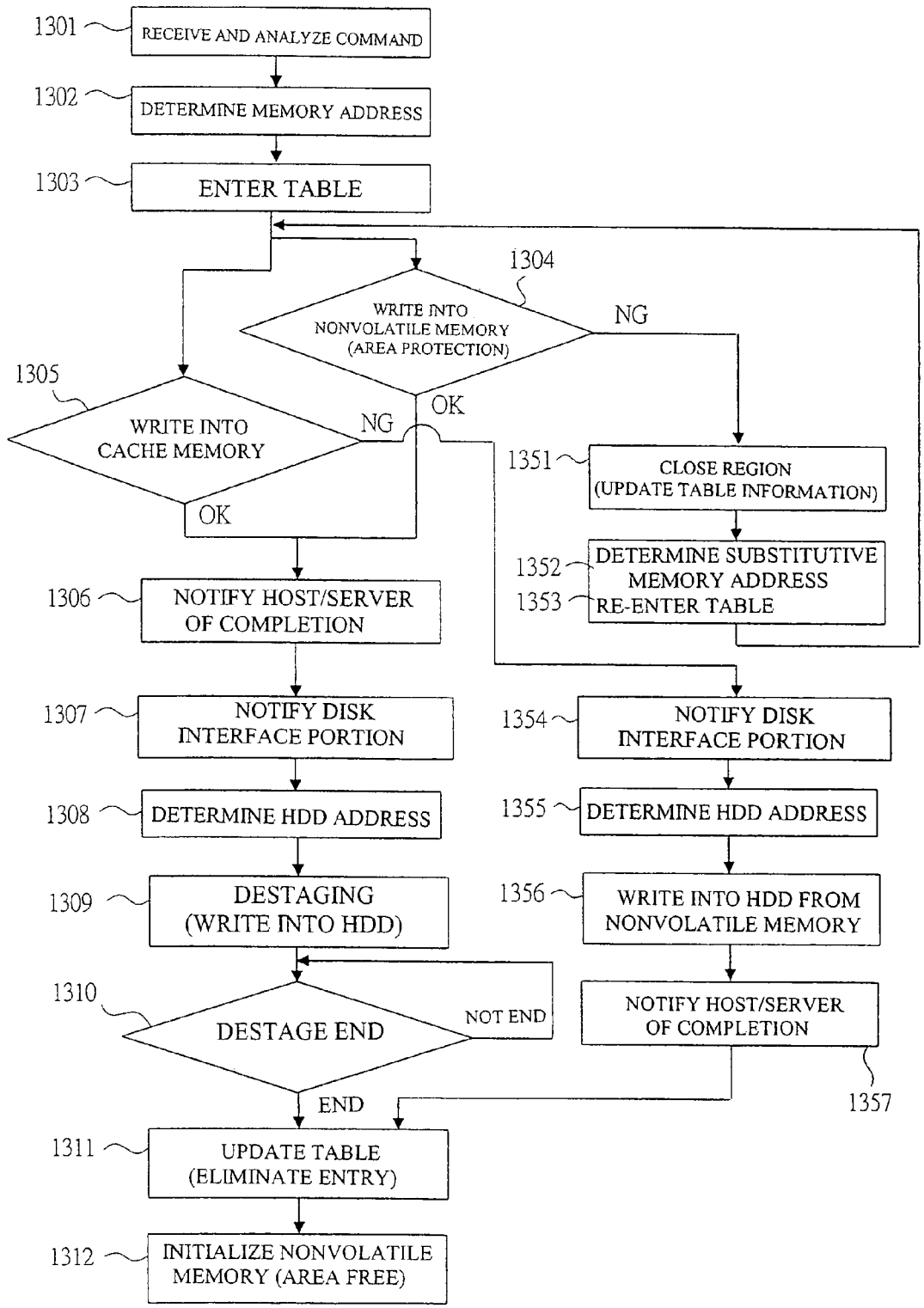
FIG. 9 is a diagram showing a recovery processing flow when data in the nonvolatile memory portion is transferred to the magnetic disk unit without interposing the global cache memory portion in the disk array device according to an embodiment of the present invention.

An example of a recovery method when a trouble occurs in the global cache memory portion in the disk array device of this embodiment will be described with reference to FIGS. 8 and 9. FIG. 8 is a diagram showing a recovery processing flow where data in the nonvolatile memory portion is transferred to the magnetic disk unit through the global cache memory portion. FIG. 9 is a diagram showing a recovery processing flow where data in the nonvolatile memory portion is transferred to the magnetic disk unit without interposing the global cache memory portion.

Two methods 1 and 2 are available when failure occurs in the global cache memory portion 14, more specifically, when the cache memory within the global cache memory portion 14 is closed and the write pending data exists there. The method 1 is one in which the host interface portion 11 reads the data in the nonvolatile memory portion 22 and transfers the data to a global cache memory portion 14 to be restored, and further the disk interface portion 12 transfers the data from the global cache memory portion 14 into the HDD 31 of the magnetic disk unit 2. The method 2 is one in which the data transfer control portion 21 of the host interface portion 11 directly transfers the data to the disk interface portion 12 from the nonvolatile memory portion 22 without interposing the global cache memory portion 14.

First, about the method 1, a processing flow for recovering data at failure will be described with reference to FIG. 8. The failure which this method 1 is applied to includes the cases where: the command is defective (step 1201); failure in the global cache memory portion 14 is detected (step 1202); a battery which backs up the global cache memory portion 14 becomes failure and thereby memory vaporization is caused (step 1203); and the like.

When at least one of the cases of: defect of the command in step 1201; failure of the global cache memory portion 14 in step 1202; and failure of the battery in step 1203 occurs and thereby the data in the global cache memory portion 14 becomes abnormal due to destruction or evaporation (step 1205), data restoration is needed (step 1206). Further, also when it is intended to restore the data by maintenance and replacement of the closed global cache memory portion 14 (step 1204), the data restoration is needed similarly thereto.

If the data restoration is needed, the host interface portion 11 determines whether or not the replacement of the global cache memory portion 14 is finished/the securement of a region is completed (step 1207). If the replacement (including extension) of the global cache memory portion 14 is not finished and the maintenance is needed ("No"), the replacement/extension of the global cache memory portion 14 is executed (step 1208).

On the other hand, if the replacement of the global cache memory portion 14 is finished/the securement of the area thereof is completed ("Yes"), the global cache memory portion 14 to be recovered and the area are secured and this secured information is entered into the control table. Then, the address is determined by allocating addresses of the global cache memory portion 14 (step 1209). Further, whether or not the data is write pending data is determined (step 1210), and if it is the write pending data ("Yes"), the data can be read out since it is stored in the nonvolatile memory portion 22.

Subsequently, the host interface portion 11 determines the address of the nonvolatile memory portion 22 and the data transfer control portion 21 reads out data from the address (step 1211). Then, the host interface portion 12 writes the data read out from the nonvolatile memory portion 22 into the global cache memory portion 14, thereby completing the data restoration (step 1213).

On the other hand, if the data is not the write pending data in step 1210 ("No"), that is, it is data at completion of the destage, the disk interface portion 12 reads out the data from the HDD 31 of the magnetic disk unit 2 into the global cache memory portion 14 (step 1212). Then, the disk interface portion 12 writes the data read out from the HDD 31 into the global cache memory portion 14, thereby completing the data restoration (step 1213).

Next, about the method 2, a processing flow for recovering the failure data will be described with reference to FIG. 9. In this method 2, when the write pending data is written directly into the HDD 31 of the magnetic disk unit 2, steps 1301 to 1353 are the same as the steps 1101 to 1153 described in FIG. 6 and, therefore, the description thereof is omitted. However, in step 1351, when a memory access is "NG" in the write into the nonvolatile memory portion 22 in step 1304, the table information of the control table is updated and the region is closed.

If write into the global cache memory portion 14 in step 1305 is "NG", the disk interface portion 12 is notified to become in a waiting condition (step 1354). Further, the host interface portion 11 preliminarily determines storage addresses in the HDD 31 for the data from the host interface portion 11 and notifies the disk interface portion 12 (step 1355). The data is transferred from the host interface portion 11 into the disk interface portion 12 through the switch portion 15, and the data in the nonvolatile memory portion 22 is written into the HDD 31 (step 1356). Then, the data is stored in the HDD 31 and, after it is confirmed that this storage has ended, the host computer/server 1 is notified of the completion (step 1357).

Each recovery method according to these methods 1 and 2 has a structure in which a plurality of memories each comprise the global cache memory portion 14 and the nonvolatile memory portion 22. Therefore, this recovery method is available even when the global cache memory portion 14 and the nonvolatile memory portion 22 need to be expanded by different host interface portions 11 or when the global cache memory portion 14 and the nonvolatile memory portion 22 are replaced due to failure. Further, the global cache memory portion 14 and the nonvolatile memory portion 22 can be installed detachably.

<Structure of Disk Interface Portion having Nonvolatile Memory Portion>

An example of the disk interface portion having the nonvolatile memory portion in the disk array device according to this embodiment will be described with reference to FIG. 10. FIG. 10 is a diagram showing the structure of the disk interface portion having the nonvolatile memory portion.

In achieving an emergency destage function at a power-off time, there is a request for providing a function of storing data not only in the HDD 31 of the magnetic disk unit but also within the disk interface portion 12 so as to guarantee the data as long as possible. For a response to this request, there is a method of providing a nonvolatile memory portion in the disk interface portion 12 to store the data also in the nonvolatile memory portion and guarantee it. In this case, because the transmission speed to the HDD 31 is slow and the transmission speed to the nonvolatile memory portion is high and the capacity of the HDD is larger than that of the nonvolatile memory portion (HDD>>nonvolatile memory portion), an arithmetic operating function of compressing data is required. Such a structure will be described below.

The disk interface portion 12 is constituted by: the I/F control portion; the MP portion provided with the LM portion; the data transfer control portion; and the nonvolatile memory portion, similarly to the host interface portion 11 shown in FIG. 3 although not shown, and has the same configuration except that the I/F control portion acts as an interface with the magnetic disk unit 2. In this disk interface portion 12, the data transfer control portion transfers the data from the global cache memory portion 14, to the magnetic disk unit 2 through the I/F control portion, by instructions of the MP portion and writes it into the HDD 31 and simultaneously into the nonvolatile memory portion.

As shown in FIG. 10, the data transfer control portion 41 within the disk interface portion 12 comprises: an error check circuit portion 401; a selector 402; a packet buffer 403; an address/command analyzing portion 406; a DMA control portion 410 having an arbitor 408 and a control register 409; and the like similarly to the data transfer control portion 21 of the host interface portion 11 (as shown in FIG. 4), and further comprises an arithmetic operating portion 430 in addition thereto. This arithmetic operating portion 430 has functions of: a parity operation of the disk array; a compression operation thereof at the time of emergency destage; and the like. Further, a nonvolatile memory portion 42 having a nonvolatile memory control portion 421 and a nonvolatile memory 422 is provided also outside the data transfer control portion 41.

<Storage Operation for Destage>

Figure 11:
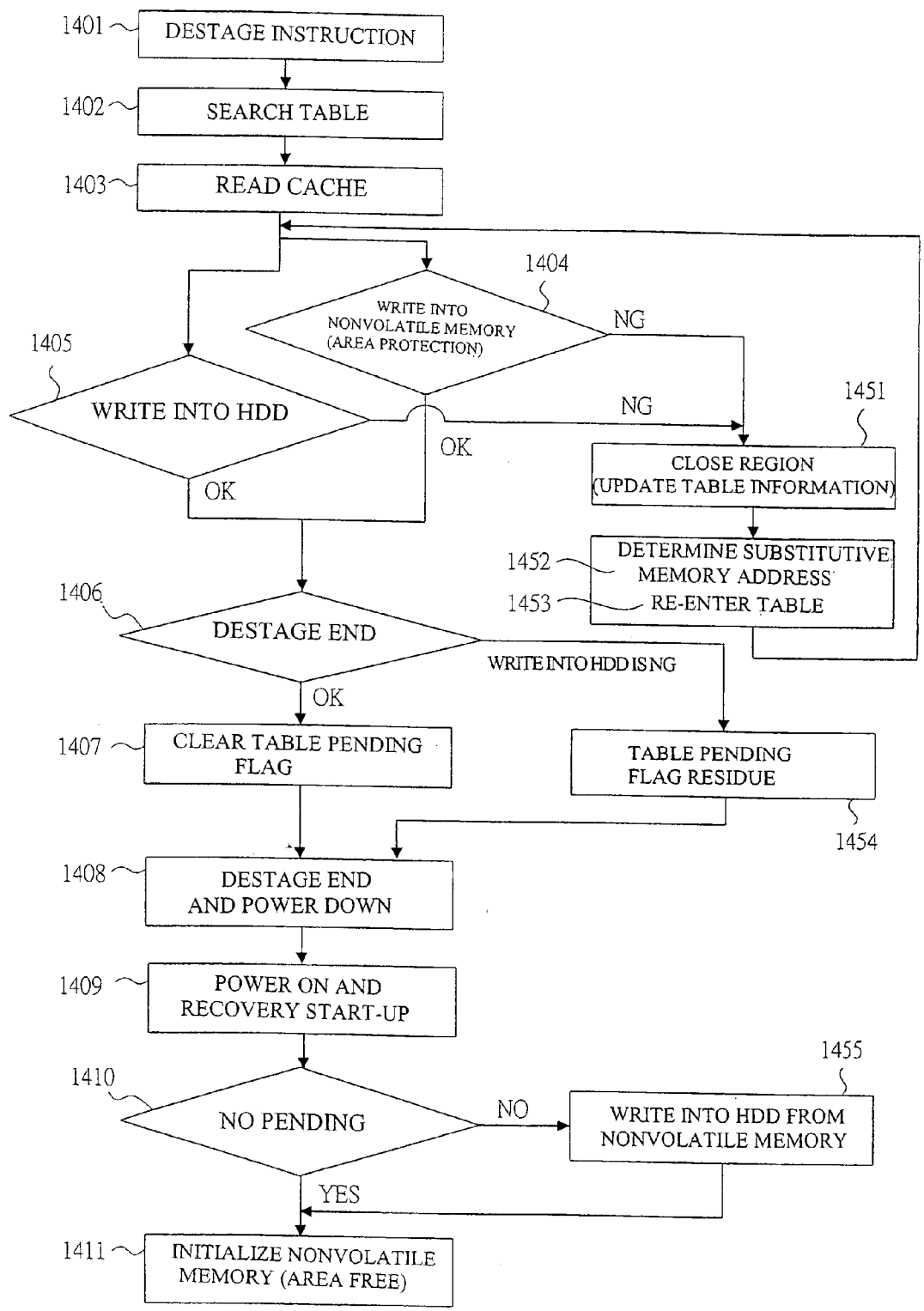
FIG. 11 is a diagram showing the processing flow of the storage operation at the time of destage in the disk array device according to an embodiment of the present invention.

An example of a processing flow for a storage operation at the time of destage in the disk array device according to this embodiment will be described with reference to FIG. 11. FIG. 11 is a diagram showing the processing flow of the storage operation at the time of the destage.

For example, when the device needs to be urgently stopped due to power supply trouble etc., the write pending data in the cache memory within the global cache memory portion 14 needs to be written into the HDD 31 of the magnetic disk unit 2 within a limited time based on an emergency destage instruction while the HDD is rotated by a reserved battery etc. This is a critical operation. Therefore, to prevent the data from being lost in view of the case where no data is transferred to the HDD 31, in the disk interface portion 12 having the nonvolatile memory portion: 42 (as shown in FIG. 10), the data is written also into the nonvolatile memory portion 42 and, if storage of the data into the HDD 31 fails, the data is written into the HDD 31 from the nonvolatile memory portion 42.

First, if the disk interface portion 12 receives an emergency destage instruction (step 1401), it searches the control table (step 1402) and reads out the write pending data from the global cache memory portion 14 (step 1403). Then, whether or not the data read out from the global cache memory portion 14 can be written into the nonvolatile memory portion 42 is determined (step 1404) and, if writable ("OK"), the data is written into the nonvolatile memory portion 42 by the data transfer control portion 41 and write-protected from being deleted. In parallel, whether or not it can be written into the HDD 31 is determined (step 1405) and, if writable ("OK"), the data is written into the HDD 31 by the data transfer control portion 41.

Then, whether or not the destage to the nonvolatile memory portion 42 and the HDD 31 is completed is determined (step 1406) and, if completed ("OK"), the pending flag of the control table is cleared (step 1407). On the other hand, if the write into the HDD 31 is "NG" in step 1406, the pending flag of the control table is left (step 1454). Then, the reserved battery is turned off, so that the power is reduced, whereby the destage is completed (step 1408).

Subsequently, if the power is turned on due to recovery (step 1409), whether or not the pending flag is left, that is, whether or not the pending data exists is determined (step 1410). If no pending data exists ("Yes"), pending information in the control table of the nonvolatile memory portion 42 is cleared and the write protect is also cleared. Therefore, the region thereof is restored (step 1411). On the other hand, if the pending data exists in step 1410, that is, if all the pending data is not written into the HDD 31 in step 1454, data is written into the HDD 31 from the nonvolatile memory portion 42 (step 1455) and the control table information of the nonvolatile memory portion 42 is cleared, whereby the region is restored (step 1411).

Note that, if accesses to the memory in the write into the nonvolatile memory portion 42 in step 1404 and in the write into the HDD 31 in step 1405 are "NG", the table information of the control table is updated and the region is closed (step 1451). Further, after substitutive memory addresses for the nonvolatile memory portion 42 and the HDD 31 are determined again (step 1452), information of areas secured in the nonvolatile memory portion 42 and the HDD 31 are re-entered into the control table (step 1453).

According to the storage operation at the time of the destage, the double writing is executed for recovery of the case of "NG" in the destage and, if the data is not stored into the HDD 31, the write pending flag is left. Thus, if this flag is left, the write from the nonvolatile memory portion 42 into the HDD 31 is executed, whereby data reliability is improved after the recovery. This principle is the same as the write buffer control of the nonvolatile memory portion 22 in the above-mentioned host interface portion 11. By writing the data also into the nonvolatile memory portion 42 when the destage speed to the HDD 31 on a side of the disk interface portion 12 is slow, even if the destage is interrupted, its procedure can be restarted later.

<Cache Read Operation>

Figure 12:
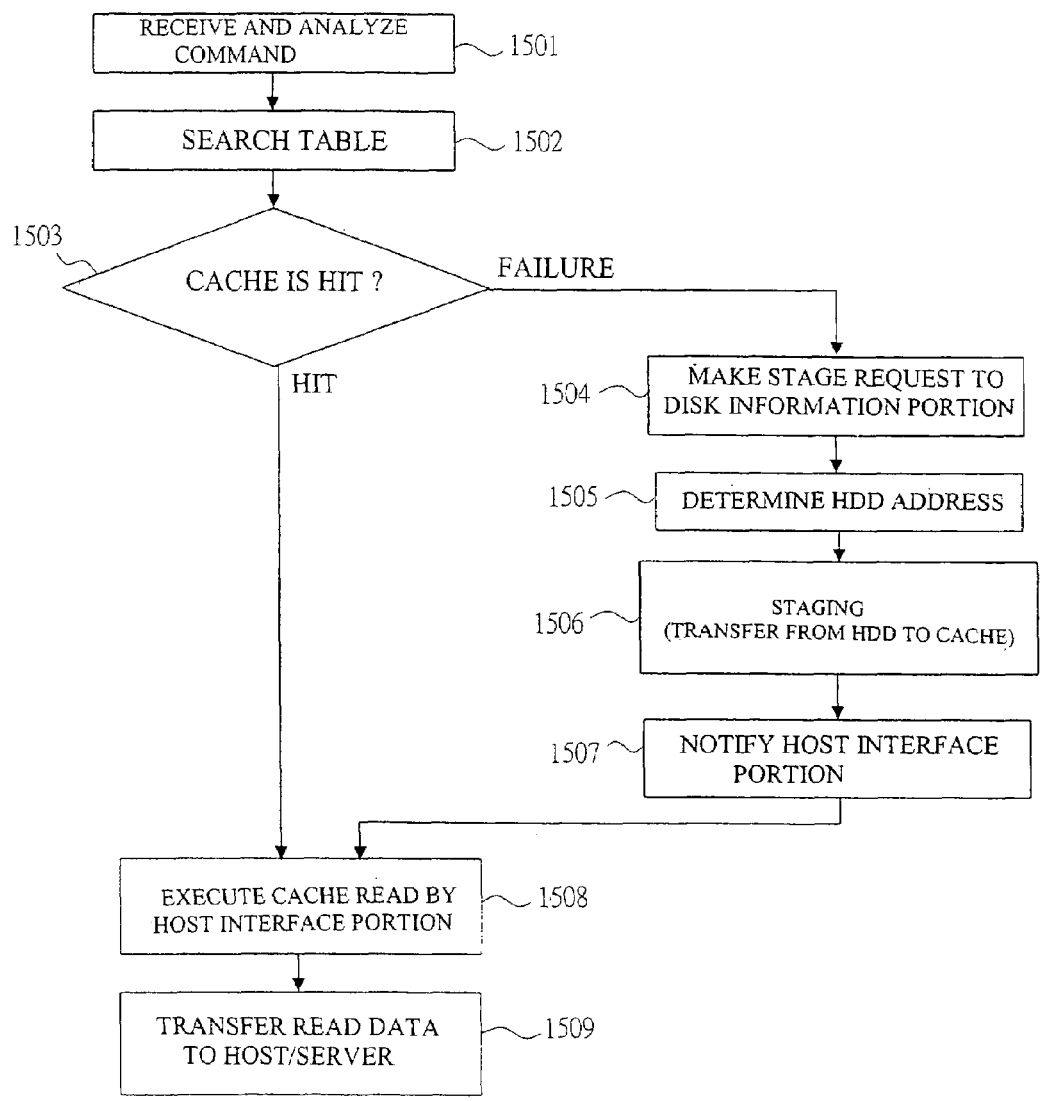
FIG. 12 is a diagram showing the processing flow of a read operation from the global cache memory portion in the disk array device according to an embodiment of the present invention.

An example of a processing flow of a read operation from the global cache memory portion in the disk array device according to this embodiment will be described with reference to FIG. 12. FIG. 12 is a diagram showing the processing flow of the read operation from the global cache memory portion.

In response to a reading request from the host computer/server 1, the following operations are executed depending on whether or not corresponding data exists in the cache memory within the global cache memory portion 14.

First, the host interface portion 11 of the disk array device receives a command from the host computer/server 1 and analyzes the content of this command (step 1501). Then, the control table is searched (step 1502), and whether or not data exists in the global cache memory portion 14, that is, whether the cache is hit or fails is determined (step 1503). If the cache is hit, the host interface portion 11 reads data from the global cache memory portion 14 (step 1508) and transfers the read data to the host computer/server 1 (step 1509).

On the other hand, if the cache fails in step 1503, the host interface portion 11 makes a stage request to the disk interface portion 12 (step 1504). Further, after the disk interface portion 12 determines the address in the HDD 31 of the magnetic disk unit 2 (step 1505), it transfers data from the HDD 31 to the global cache memory portion 14 (step 1506). A processing for transferring data from the HDD 31 to the global cache memory portion 14 is called "staging". The staging has ended, and thereafter it is informed to the host interface portion 11 (step 1507). By such a notification, the host interface portion 11 reads out data from the global cache memory portion 14 (step 1508) and transfers the read data to the host computer/server 1 (step 1509).

<Data Flow of Cache Read Operation>

Figure 13:
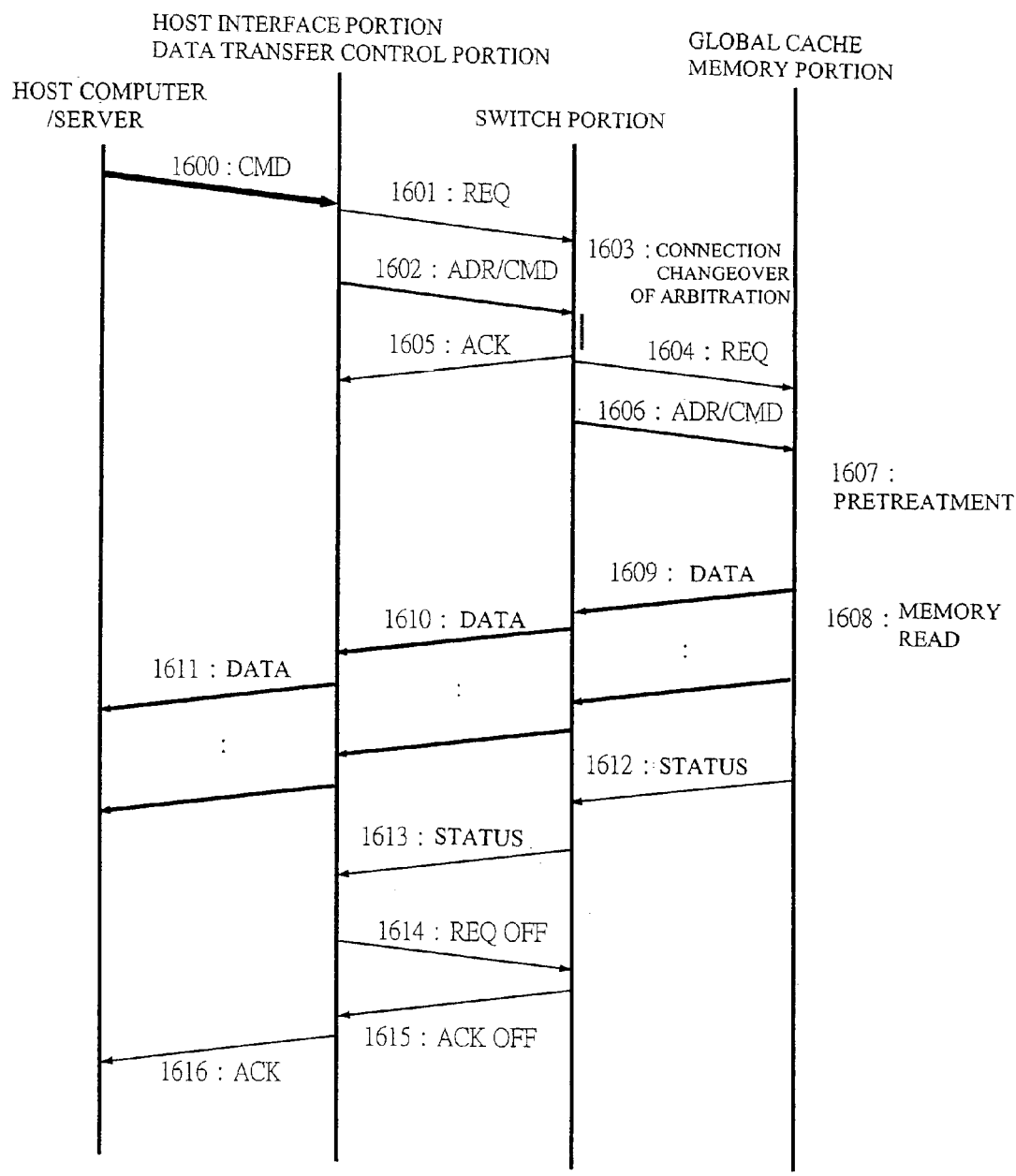
FIG. 13 is a diagram showing a data flow of the cache read operation in the disk array device according to an embodiment of the present invention.

An example of the data flow of the cache read operation in the disk array device of this embodiment will be described with reference to FIG. 13. FIG. 13 is a diagram showing the data flow of the cache read operation.

First, if a command is transferred from the host computer/server 1, the transferred command is received by the host interface portion 1 and stored in the packet buffer 303 in the data transfer control portion 21 (step 1600), and the address/command analyzing portion 306 analyzes the command. The data transfer control portion 21 sends a request signal indicating an access start, to the switch portion 15 through the selector 302 (step 1601). Subsequently, the data transfer control portion 21 continuously sends out an address and command to the switch portion 15 (step 1602).

If the switch portion 15 receives the request signal from the data transfer control portion 21, it receives the continuously sent address and command and executes arbitration based on an access request, and, based on the result of this, a connection is sifted to the global cache memory portion 14 (step 1603). Further, the switch portion 15 sends back an acknowledge signal indicating that an access right to the global cache memory portion 14 is obtained, to the data transfer control portion 21 (step 1605).

The switch portion 15 sends a request signal indicating the access start, to the global cache memory portion 14 (step 1604). Subsequently, the switch portion 15 sends addresses and commands continuously to the global cache memory portion 14 (step 1606).

Then, the global cache memory portion 14 executes a pretreatment for a memory access (step 1607) and reads out data from the global cache memory portion 14 (step 1608). Then, the global cache memory portion 14 transfers the read data to the switch portion 15 (step 1609). Further, the switch portion 15 transfers the transferred data to the data transfer control portion 21 (step 1610). Then, the data transfer control portion 21 transfers the read data to the host computer/server 1 (step 1611).

After the memory read has ended, the global cache memory portion 14 sends out a status to the switch portion (step 1612). Further, the switch portion 15 sends the received status data to the data transfer control portion 21 (step 1613). Then, the data transfer control portion 21 receives the status and turns off the request signal to the switch portion 15 (step 1614).

Further, the switch portion 15 confirms that the request signal from the data transfer control portion 21 is turned off, the acknowledge signal to the data transfer control portion 21 is turned off (step 1615). Then, the data transfer control portion 21 confirms that the acknowledge signal from the switch portion 15 is turned off, and transfers the acknowledge signal to the host computer/server 1 (step 1616).

<Data Mutual Control by Plural Nonvolatile Memory Portions>

Figure 14:
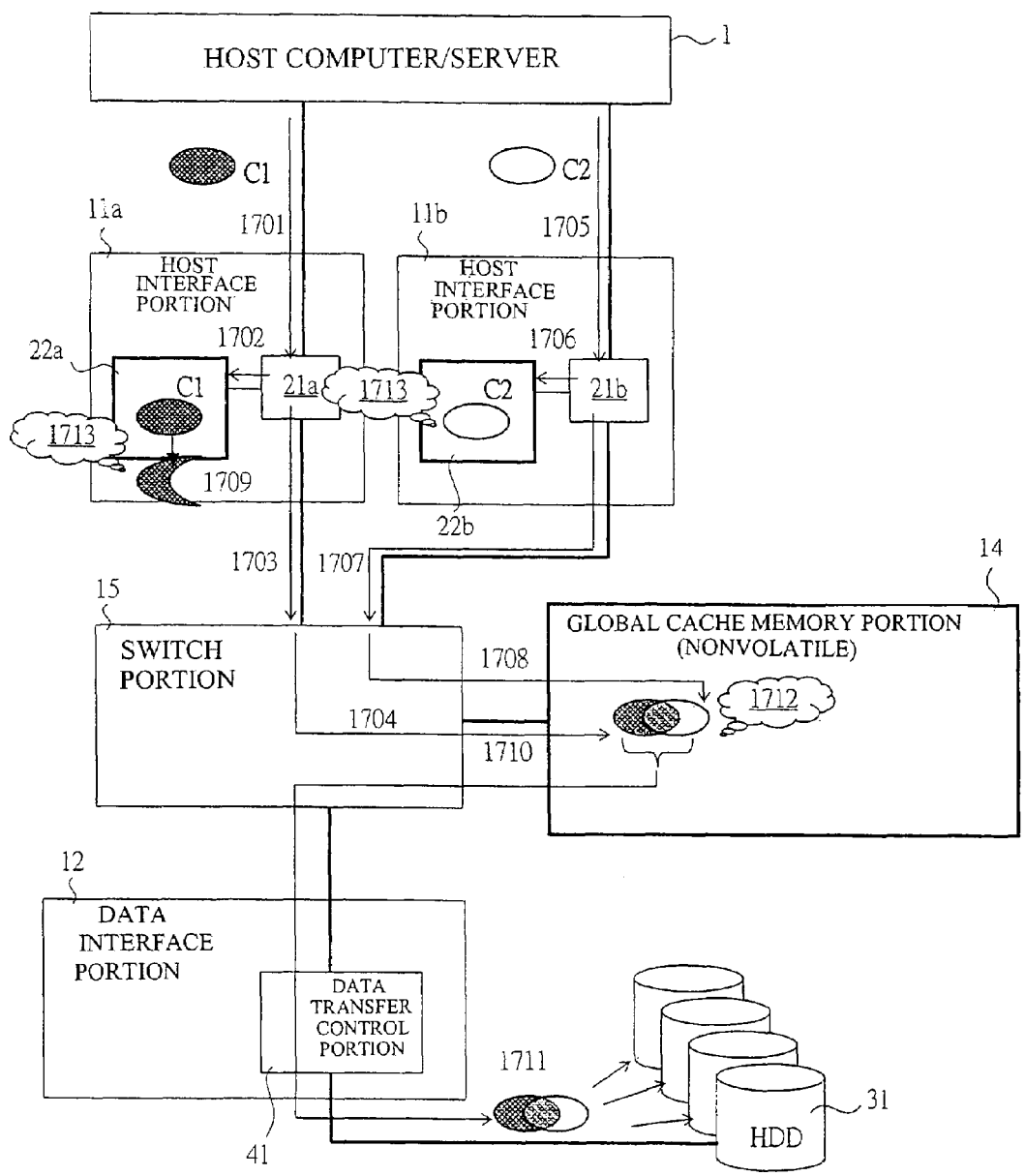
FIG. 14 is a diagram showing the case of securing a minimum backup in a plurality of nonvolatile memory portions in the disk array device according to an embodiment of the present invention.
Figure 15:
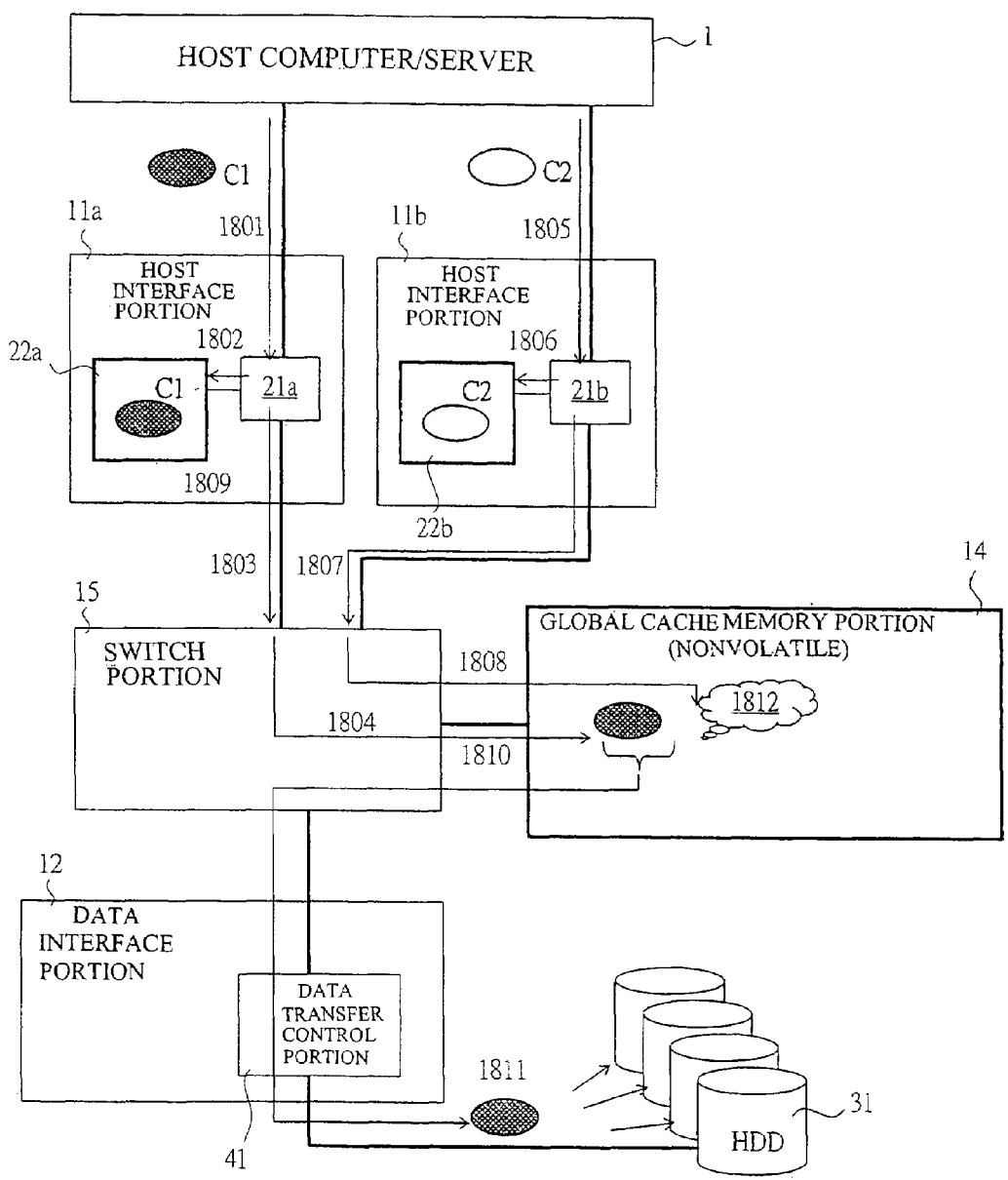
FIG. 15 is a diagram showing the case of securing multiplex backups by controlling time in the plurality of nonvolatile memory portions in the disk array device according to an embodiment of the present invention.

An example of data mutual control in a plurality nonvolatile memory portions in the disk array device according to this embodiment will be described with reference to FIGS. 14 to 16. FIG. 14 is a diagram showing the case of securing the minimum backup in a plurality of nonvolatile memory portions; FIG. 15 is a diagram showing the case for securing multiple backups by controlling times in the plurality of nonvolatile memory portions; and FIG. 16 is a diagram showing a control table including time control information in the case of FIG. 15.

As shown in FIG. 14, if a plurality of paths exist on the host computer/server 1 (two paths in this example) and if related data exists at the position having the same address on the global cache memory portion 41 in each of the host interface portions 11a and 11b having respectively data transfer control portions 21a and 21b and nonvolatile memory portions 22a and 22b, then storage on the nonvolatile memory portions 22a and 22b in the host interface portions 11a and 11b can be controlled aggressively.

More specifically, the data is overwritten in the global cache memory portion 14 in order of commands. However, in a stage after the data has been overwritten, the overwritten date on the nonvolatile memory portions 22a and 22b, which is a backup of old data, is cleared, that is, is made free. When all the data is destaged, the remaining data in the nonvolatile memory portions 22a and 22b can be controlled so as to be cleared.

In this case, it is assumed that a host command (write data) 1 by a first path from the host computer/server 1 is denoted by the reference symbol "C1" and a host command (write data) 2 by a second path is denoted by "C2", wherein the C2 overlaps the C1 partially in terms of data/address.

When the C1 is issued from the host computer/server 1 to the host interface portion 11a (step 1701), the C1 is written from the data transfer control portion 21a into the nonvolatile memory portion 22a (step 1703) and is transferred to the switch portion 15 (step 1703). Then, the C1 is written from the switch portion 15 into the global cache memory portion 14 (step 1704).

On the other hand, when the C2 is issued from the host computer/server 1 to the host interface portion 11b (step 1705), the C2 is written from the data transfer control portion 21b into the nonvolatile memory portion 22b (step 1706) and is transferred to the switch portion 15 (step 1707). Then, the C2 is written into the global cache memory portion 14 from the switch portion 15 (step 1708). At this time, if data of the previously written C1 is overlapped partially, data of the C2 is written into the global cache memory portion 14.

Subsequently, the overlapping data of the C1 is cleared from the nonvolatile memory portion 22a (step 1709). Then, the data of combination of the C1 and C2 is transferred from the global cache memory portion 14 to the disk interface portion 12 (step 1710). Consequently, the data of combination of the C1 and C2 is written into the HDD 31 of the magnetic disk unit 2 from the disk interface portion 12 (step 1711). After the writing into the HDD 31 is completed, the data of combination of the C1 and C2 is cleared from the global cache memory portion 14 (step 1712). Then, the remaining data of the C1, namely, a portion of the C1 except a common portion to the C2 is cleared from the nonvolatile memory portion 22a, and the data of the C2 is cleared from the nonvolatile memory portion 22b (step 1713). At this time, a common portion to the C2 out of the C1 is stored in the nonvolatile memory portion 22a.

According to this control, if the data on the global cache memory portion 14 is shared by the plurality of host interface portions 11a and 11b, to have the plurality of backups is usually reduced in efficiency. Therefore, by executing the minimum backup, it is possible to achieve a backup based on interaction of the data stored in the nonvolatile memory portions 22a and 22b.

Contrary to the above-mentioned control, a method of retaining a backup is also available. That is, this method is one that does not delete the data in the nonvolatile memory portions 22a and 22b and the data in the global cache memory portion 14 in conjunction with each other. Ordinarily, in conjunction with the data in the global cache memory portion 14, the data in the nonvolatile memory portions 22a and 22b is deleted. Further, as described above, if the same data exists in the global cache memory portion 14, also a method of leaving the data obtained at the later-executed backup to delete the old data has an advantage in that a storage area of the memory is not wasted. However, if the data obtained at the later-executed backup is left, another control method of securing multiple backups by controlling time becomes necessary.

In this control, the control table shown in FIG. 16 is used. Instead of the protection flag information as shown in FIG. 7, information of protection identifiers and time stamp are stored in this control table. As for the protection identifier, the symbol "00" means normal (data body), "01" means protect (data body), "02" means backup 1, "003" means backup 2, and "04" means backup 3. Time stamp is information indicating a time written in view of a generation backup.

As for the control using this control table, as shown in FIG. 15, in the case of the data (overwritten data) in which the C2 overlaps the C1 in terms of address, steps 1801 to 1808 are the same as the above-described steps 1701 to 1708. In step 1808, if the previously written C1 is overlapped in step 1808, the data of the C2 is written into the global cache memory portion 14.

Subsequently, without clearing the overlapping data of the C1 from the nonvolatile memory portion 22a, a backup value of the protection identifier on the control table shown in FIG. 16 is rewritten and the time stamp is recorded (step 1809). Then, the data of combination of the C1 and C2 is transferred from the global cache memory portion 14 to the disk interface portion 12 (step 1810). Consequently, the data of combination of the C1 and C2 is written into the HDD 31 of the magnetic disk unit 2 from the disk interface portion 12 (step 1811). After the writing into the HDD 31 is completed, the data of combination of the C1 and C2 is cleared from the global cache memory portion 14 (step 1812).

The C1 on the nonvolatile memory portion 22a and the C2 on the nonvolatile memory portion 22b are controlled by the host interface portions 11a and 11b and the host computer/server 1 and are served as a backup data until a request for deletion is dispatched.

According to such control, the plurality of data can be dispersed and backed up. That is, it is possible to select either of the case of changing the structure of the control table and maintaining it as a backup or the case of deleting it in conjunction with the global cache memory portion 14, whereby a simple generation backup can be achieved by leaving a plurality of pieces of data.

<Mounting of Nonvolatile Memory Portion>

As shown in this embodiment, if the nonvolatile memory portions 22 and 42 are mounted on the host interface portion 11 and the disk interface portion 12, access time can be further reduced by the fact that the mounting is set to a memory array structure. Particularly, if a buffer size is enlarged by an interface such as a main frame, it is possible to cope with the problem of such an enlarged buffer size by utilizing the technique disclosed in, for example, Japanese Patent Laid-open No. 2002-17853. That is, a necessity of expanding the buffer size exists depending on the types of the main frame and the technique disclosed in the above-described gazette can be used for a solution of the expansion necessity. Therefore, since the structure having the plurality of memories is adopted, different host interface portions and disk interface portions can cope with the cases where an expansion of the memories is required or where the nonvolatile memory portion is replaced due to its failure.

Effects of Embodiment (1) By adopting the method of adding the nonvolatile memory portion 22 onto the host interface portion 11 and then writing data into the global cache memory portion 14 and both portions, the double writing can be achieved and, at the same time, the consumption on a band of the switch portion 15 can be reduced by half and the performance of the device can be improved. That is, since the concept of a double writing system is being adopted, the path of the global cache memory portion 14 in the switch portion 15 is one-on-one connected to the host interface portion 11 or the disk interface portion 12. Therefore, the consumption on the band can reduced and the band of the switch portion 15 can be equalized to that of a single writing system.

(2) In the double writing system, an instruction of transfer to the switch portion 15 is written only single and the other band of the switch portion 15 is used for other processing, so that a high-speed processing thereof can be achieved. That is, since the band used conventionally for the data write into the global cache memory portion 14 can be used for a processing of the plurality of host interface portions 11, the performance of transfer to the host computer/server 1 can be enhanced. Consequently, the present invention can cope with the high-speed processing and data reliability can be maintained.

(3) As for increases in the disk capacity and the cache memory capacity and enlargement in the device size such as an expansion of the switch, even if the data in the global cache memory portion 14 is destroyed, data loss can be prevented by writing the data in the nonvolatile memory portion 22 of the host interface portion 11, into the HDD 31 of the magnetic disk unit 2. Consequently, the present invention can cope with the high-speed processing and data reliability can be maintained.

(4) The disk array device can be achieved to have a hierarchical architecture of securing data in the host interface portion 11 and securing data in the global cache memory portion 14 to store the data in the HDD 31 of the magnetic disk unit.

(5) When the disk interface portion 13 is capable of transferring data from the global cache memory portion 14 to the HDD 31 of the magnetic disk unit 2, the present invention can achieve such a structure that the memory region is not secured exhaustlessly by releasing the same data region existing in the nonvolatile memory portion 22 within the host interface portion 11.

(6) Even if the write pending data exists in the global cache memory portion 14 which is closed due to failure etc. in the global cache memory portion 14, the data written into the HDD 31 of the magnetic disk unit 2 can be restored using the data in the nonvolatile memory portion 22.

(7) Even if the destage speed to the HDD 31 of the magnetic disk unit 2 on a side of the disk interface portion 12 is slow at the time of the destage and if the writing of data into the nonvolatile memory portion 42 is finished on the way, it is possible to guarantee such a write processing by later using the data written in the nonvolatile memory portion 42.

(8) If the data on the global cache memory portion 14 is shared by the plurality of host interface portions 11a and 11b, the interaction of each data in the nonvolatile memory portions 22a and 22b is used to achieve the minimum backup and to achieve the multiple backups by controlling time, whereby the generation backup can be achieved.

As described above, the invention made by the present inventors has been concretely described based on the embodiment. However, needless to say, the present invention is not limited to the above-mentioned embodiment and can be variously modified and altered without departing from the gist thereof.

What is claimed is:

1. A disk array device comprising:
a plurality of memory devices for storing data;
a memory device control portion for controlling write or read of data to/from said plurality of memory devices;
a channel control portion for receiving a write or read request from an upper device disposed outside the disk array device;
a cache memory for storing temporarily data transmitted between said upper device and said plurality of memory devices; and
a connecting portion connected to said channel control portion, said memory device control portion, and said cache memory,
wherein said channel control portion comprises:
a first nonvolatile memory for saving write data from said upper device, and
a first data transfer control portion for transferring the write data from said upper device to both of said first nonvolatile memory and said cache memory,
wherein the channel control portion has a function of transferring the write data from said upper device to both of said first nonvolatile memory and said cache memory through said connecting portion by said first data transfer control portion and then writing the write data in both of said first nonvolatile memory and said cache memory to permit recovery of the write data using the write data written to said first nonvolatile memory, when the write request from said upper device is received, and
wherein a completion notice is sent to said upper device upon completion of the writing of the write data in said first nonvolatile memory and said cache memory.

2. The disk array device according to claim 1, wherein said memory device control portion has a function of transferring the data written in said cache memory, from said cache memory to said memory device and then writing the transferred data therein, and
wherein said channel control portion has a function of releasing a region of the data written in said first nonvolatile memory after the data in said cache memory is written into said memory device.

3. A disk array device comprising:
a plurality of memory devices for storing data;
a memory device control portion for controlling write or read of data to/from said plurality of memory devices;
a channel control portion for receiving a write or read request from an upper device disposed outside a disk array device;
a cache memory for storing temporarily data transmitted between said upper device and said plurality of memory devices; and
a connecting portion connected to said channel control portion, said memory device control portion, and said cache memory,
wherein said channel control portion comprises:
a first nonvolatile memory for saving write data from said upper device; and
a first data transfer control portion for transferring the write data from said upper device, to said first nonvolatile memory and said cache memory,
wherein the channel control portion has a function of transferring the write data from said upper device, to said first nonvolatile memory and to said cache memory through said connecting portion, by said first data transfer control portion and then writing the write data therein when the write request from said upper device is received,
wherein said channel control portion has a function of reading out the data written in said first nonvolatile memory and writing the read data into said cache memory at the time of recovery after failure occurs in said cache memory,
wherein said memory device control portion has a function of reading out the data written in said cache memory and transferring the read data to said memory device and writes the transferred data therein, and
wherein a completion notice is sent to said upper device upon completion of the writing of the write data in said first nonvolatile memory and said cache memory.

4. The disk array device according to claim 3, wherein said channel control portion has a function of releasing a region of the write data written in said first nonvolatile memory after the write data in said cache memory is written into said memory device.

5. A disk array device comprising:
a plurality of memory devices for storing data;
a memory device control portion for controlling write or read of data to/from said plurality of memory devices;
a channel control portion for receiving a write or read request from an upper device disposed outside a disk array device;
a cache memory for storing temporarily data transmitted between said upper device and said plurality of memory devices; and
a connecting portion connected to said channel control portion, said memory device control portion, and said cache memory,
wherein said channel control portion comprises:
a first nonvolatile memory for saving write data from said upper device; and
a first data transfer control portion for transferring the write data from said upper device, to said first nonvolatile memory and said cache memory,
wherein the channel control portion has a function of transferring the write data from said upper device, to said first nonvolatile memory and to said cache memory through said connecting portion, by said first data transfer control portion and then writing the write data therein when the write request from said upper device is received, wherein said channel control portion has a function of reading out the data written in said first nonvolatile memory and transferring the read data to said memory device and writing the transferred data therein at the time of recovery after failure occurs in said cache memory, and wherein a completion notice is sent to said upper device upon completion of the writing of the write data in said first nonvolatile memory and said cache memory.

6. The disk array device according to claim 5, wherein said channel control portion has a function of releasing a region of data written in said first nonvolatile memory after data in said first nonvolatile memory is written into said memory device.

7. A disk array device comprising:

a plurality of memory devices for storing data;

a memory device control portion for controlling write or read of data to/from said plurality of memory devices;

a channel control portion for receiving a write or read request from an upper device disposed outside a disk array device;

a cache memory for storing temporarily data transmitted between said upper device and said plurality of memory devices; and a connecting portion connected to said channel control portion, said memory device control portion, and said cache memory, wherein said channel control portion comprises:

a first nonvolatile memory for saving write data from said upper device; and a first data transfer control portion for transferring the write data from said upper device, to said first nonvolatile memory and said cache memory, wherein the channel control portion has a function of transferring the write data from said upper device, to said first nonvolatile memory and to said cache memory through said connecting portion, by said first data transfer control portion and then writing the write data therein when the write request from said upper device is received, wherein a completion notice is sent to said upper device upon completion of the writing of the write data in said first nonvolatile memory and said cache memory, wherein said memory device control portion comprises:

a second nonvolatile memory for storing data written in said cache memory, and a second data transfer control portion for transferring the data written in said cache memory to said second nonvolatile memory and said memory device, and wherein the memory device control portion has a function of transferring, by said second data transfer control portion, the data written into said cache memory to said second nonvolatile memory and said memory device and then writing the transferred data therein when a destage request is received.

8. The disk array device according to claim 7, wherein said memory device control portion has a function of reading out data written in said second nonvolatile memory and transferring the read data to said memory device and writing the transferred data therein when the data written in said cache memory is not transferred to said memory device.

9. The disk array device according to claim 8, wherein said memory device control portion has a function of releasing a region of data written in said second nonvolatile memory after data in said second nonvolatile memory is written into said memory device.

10. A disk array device comprising:

a plurality of memory devices for storing data;

a memory device control portion for controlling write or read of data to/from said plurality of memory devices;

a channel control portion for receiving a write or read request from an upper device disposed outside a disk array device;

a cache memory for storing temporarily data transmitted between said upper device and said plurality of memory devices; and a connecting portion connected to said channel control portion, said memory device control portion, and said cache memory, wherein said channel control portion comprises:

a first nonvolatile memory for saving write data from said upper device; and a first data transfer control portion for transferring the write data from said upper device, to said first nonvolatile memory and said cache memory, wherein the channel control portion has a function of transferring the write data from said upper device, to said first nonvolatile memory and to said cache memory through said connecting portion, by said first data transfer control portion and then writing the write data therein when the write request from said upper device is received, wherein a completion notice is sent to said upper device upon completion of the writing of the write data in said first nonvolatile memory and said cache memory, wherein the number of said channel control portion is two or more to receive a write or read request through a plurality of paths between said upper device and the channel control portion, wherein a first channel control portion comprises:

a third nonvolatile memory for saving first write data from said upper device through a first path, and a third data transfer control portion for transferring the first write data from said upper device to said third nonvolatile memory and said cache memory, wherein a second channel control portion comprises:

a fourth nonvolatile memory for saving second write data from said upper device through a second pass, and a fourth data transfer control portion for transferring the second write data from said upper device to said fourth nonvolatile memory and said cache memory, and wherein, when said second write data is input after said first write data, said first channel control portion has a function of:

transferring, by said third data transfer control portion, said first write data to said third nonvolatile memory and said cache memory, writing the first write data therein, confirming that the first write data is transferred from said cache memory to said memory device and written, and thereafter saving said first write data within said third nonvolatile memory, and wherein, when said second write data is input after said first write data, said second channel control portion has a function of:

transferring, by said fourth data transfer control portion, said second write data to said fourth nonvolatile memory and said cache memory, writing the second write data therein, confirming that said second write data is transferred from said cache memory to said memory device and written, and thereafter saving said second write data in said fourth nonvolatile memory.

11. A data processing method for a disk array device which includes a plurality of memory devices for storing data, a memory device control portion for controlling write or read of data to/from said plurality of memory devices a channel control portion for receiving a write or read request from an upper device disposed outside a disk array device, a cache memory for storing temporarily data transmitted between said upper device and said plurality of memory devices, and a connecting portion connected to said channel control portion, said memory device control portion, and said cache memory, wherein said channel control portion includes a first nonvolatile memory for saving write data from said upper device, and a first data transfer control portion for transferring the write data from said upper device to said first nonvolatile memory and said cache memory, the data processing method, implemented by the channel control portion, comprising the steps of:
- transferring the write data from said upper device to both of said first nonvolatile memory and said cache memory through said connecting portion by said first data transfer control portion; and
- writing the write data in both of said first nonvolatile memory and said cache memory to permit recovery of the write data using the write data written to said first nonvolatile memory, when the write request from said upper device is received, and
- wherein a completion notice is sent to said upper device upon completion of the writing of the write data in said first nonvolatile memory and said cache memory.

12. The data processing method according to claim 11, wherein said memory device control portion transfers the data written in said cache memory, from said cache memory to said memory device and then writes the transferred data therein, and
- wherein said channel control portion releases a region of the data written in said first nonvolatile memory after the data in said cache memory is written into said memory device.

13. A data processing method for a disk array device which includes a plurality of memory devices for storing data, a memory device control portion for controlling write or read of data to/from said plurality of memory devices a channel control portion for receiving a write or read request from an upper device disposed outside a disk array device, a cache memory for storing temporarily data transmitted between said upper device and said plurality of memory devices, and a connecting portion connected to said channel control portion, said memory device control portion, and said cache memory, wherein said channel control portion includes a first nonvolatile memory for saving write data from said upper device, and a first data transfer control portion for transferring the write data from said upper device, to said first nonvolatile memory and said cache memory, the data processing method, implemented by the channel control portion, comprising the steps of:
- transferring the write data from said upper device to said first nonvolatile memory and to said cache memory through said connecting portion by said first data transfer control portion; and
- writing the write data therein, when the write request from said upper device is received,
- wherein said channel control portion reads out the data written in said first nonvolatile memory and writes the read data into said cache memory at the time of recovery after failure occurs in said cache memory,
- wherein said memory device control portion reads out the data written in said cache memory and transfers the read data to said memory device and writes the transferred data therein, and
- wherein a completion notice is sent to said upper device upon completion of the writing of the-write data in said first nonvolatile memory and said cache memory.

14. The data processing method according to claim 13, wherein said channel control portion releases a region of the data written in said first nonvolatile memory after data in said cache memory is written into said memory device.

15. A data processing method for a disk array device which includes a plurality of memory devices for storing data, a memory device control portion for controlling write or read of data to/from said plurality of memory devices a channel control portion for receiving a write or read request from an upper device disposed outside a disk array device, a cache memory for storing temporarily data transmitted between said upper device and said plurality of memory devices, and a connecting portion connected to said channel control portion, said memory device control portion, and said cache memory, wherein said channel control portion includes a first nonvolatile memory for saving write data from said upper device, and a first data transfer control portion for transferring the write data from said upper device, to said first nonvolatile memory and said cache memory, the data processing method, implemented by the channel control portion, comprising the steps of:
- transferring the write data from said upper device to said first nonvolatile memory and to said cache memory through said connecting portion by said first data transfer control portion; and
- writing the write data therein, when the write request from said upper device is received,
- wherein said channel control portion reads out the data written in said first nonvolatile memory and transfers the read data to said memory device and writes the transferred data therein at the time of recovery after failure occurs in said cache memory, and
- wherein a completion notice is sent to said upper device upon completion of the writing of the write data in said first nonvolatile memory and said cache memory.

16. The data processing method according to claim 15, wherein said channel control portion releases a region of the data written in said first nonvolatile memory after data in said first nonvolatile memory is written into said memory device.

17. A data processing method for a disk array device which includes a plurality of memory devices for storing data, a memory device control portion for controlling write or read of data to/from said plurality of memory devices a channel control portion for receiving a write or read request from an upper device disposed outside a disk array device, a cache memory for storing temporarily data transmitted between said upper device and said plurality of memory devices, and a connecting portion connected to said channel control portion, said memory device control portion, and said cache memory, wherein said channel control portion includes a first nonvolatile memory for saving write data from said upper device, and a first data transfer control portion for transferring the write data from said upper device, to said first nonvolatile memory and said cache memory, the data processing method, implemented by the channel control portion, comprising the steps of:

transferring the write data from said upper device to said first nonvolatile memory and to said cache memory through said connecting portion by said first data transfer control portion; and writing the write data therein, when the write request from said upper device is received, wherein said memory device control portion comprises:

a second nonvolatile memory for storing data written in said cache memory, a second data transfer control portion for transferring the data written in said cache memory to said second nonvolatile memory and said memory device, and wherein the memory device control portion transfers, by said second data transfer control portion, the data written into said cache memory to said second nonvolatile memory and said memory device and then writes the transferred data therein when a destage request is received, and wherein a completion notice is sent to said upper device upon completion of the writing of the write data in said first nonvolatile memory and said cache memory.

18. The data processing method according to claim 17, wherein said memory device control portion reads out the data written in said second nonvolatile memory and transfers the read data to said memory device and writes the transferred data therein when the data written in said cache memory is not transferred to said memory device.

19. The data processing method according to claim 18, wherein said memory device control portion releases a region of the data written in said second nonvolatile memory after data in said second nonvolatile memory is written into said memory device.

20. A data processing method for a disk array device which includes a plurality of memory devices for storing data, a memory device control portion for controlling write or read of data to/from said plurality of memory devices a channel control portion for receiving a write or read request from an upper device disposed outside a disk array device, a cache memory for storing temporarily data transmitted between said upper device and said plurality of memory devices, and a connecting portion connected to said channel control portion, said memory device control portion, and said cache memory, wherein said channel control portion includes a first nonvolatile memory for saving write data from said upper device, and a first data transfer control portion for transferring the write data from said upper device, to said first nonvolatile memory and said cache memory, and the data processing method, implemented by the channel control portion, comprising the steps of:

transferring the write data from said upper device to said first nonvolatile memory and to said cache memory through said connecting portion by said first data transfer control portion; and writing the write data therein, when the write request from said upper device is received, wherein the number of said channel control portion is two or more to receive a write or read request through a plurality of paths between said upper device and the channel control portion, wherein a completion notice is sent to said upper device upon completion of the writing of the write data in said first nonvolatile memory and said cache memory, wherein a first channel control portion comprises:

a third nonvolatile memory for saving first write data from said upper device through a first path, and a third data transfer control portion for transferring the first write data from said upper device to said third nonvolatile memory and said cache memory, and wherein a second channel control portion comprises:

a fourth nonvolatile memory for saving second write data from said upper device through a second pass, and a fourth data transfer control portion for transferring the second write data from said upper device to said fourth nonvolatile memory and said cache memory, wherein, when said second write data is input after said first write data, said first channel control portion transfers, by said third data transfer control portion, said first write data to said third nonvolatile memory and said cache memory, writes the first write data therein, confirms that the first write data is transferred from said cache memory to said memory device and written, and thereafter saves said first write data within said third nonvolatile memory, and wherein, when said second write data is input after said first write data, said second channel control portion transfers, by said fourth data transfer control portion, said second write data to said fourth nonvolatile memory and said cache memory, writes the second write data therein, confirms that said second write data is transferred from said cache memory to said memory device and written, and thereafter saves said second write data in said fourth nonvolatile memory.

* * * * *